United States Patent
Tsunoda

(10) Patent No.: US 7,689,596 B2
(45) Date of Patent: Mar. 30, 2010

(54) DATA TRANSMISSION DEVICE AND METHOD FOR CONTROLLING THE SAME AND IMAGE READING APPARATUS USING THE SAME

(75) Inventor: Masami Tsunoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 645 days.

(21) Appl. No.: 11/357,163

(22) Filed: Feb. 21, 2006

(65) Prior Publication Data

US 2006/0190496 A1    Aug. 24, 2006

(30) Foreign Application Priority Data

Feb. 21, 2005    (JP)    ............... 2005-044460

(51) Int. Cl.
    *G06F 17/30*    (2006.01)
(52) U.S. Cl. ............... 707/200; 707/10; 358/1.15; 358/448
(58) Field of Classification Search ............ None
    See application file for complete search history.

(56) References Cited

U.S. PATENT DOCUMENTS

| | | | |
|---|---|---|---|
| 6,345,288 B1 * | 2/2002 | Reed et al. ............ | 709/201 |
| 6,883,000 B1 * | 4/2005 | Gropper ............ | 707/10 |
| 7,315,388 B2 * | 1/2008 | Fujiwara et al. ............ | 358/1.15 |
| 2002/0093674 A1 * | 7/2002 | Ferlitsch et al. ............ | 358/1.15 |
| 2003/0117665 A1 * | 6/2003 | Eguchi et al. ............ | 358/402 |
| 2004/0019634 A1 * | 1/2004 | Van Geldern et al. ....... | 709/203 |
| 2004/0032611 A1 * | 2/2004 | Daly et al. ............ | 358/1.13 |
| 2006/0039028 A1 * | 2/2006 | Okutsu et al. ............ | 358/1.15 |

FOREIGN PATENT DOCUMENTS

| | | |
|---|---|---|
| JP | 2001-285520 | 10/2001 |
| JP | 2003-108479 | 4/2003 |
| JP | 2003-134260 | 5/2003 |
| JP | 2003-233563 | 8/2003 |

* cited by examiner

*Primary Examiner*—Pierre M Vital
*Assistant Examiner*—Loan T Nguyen
(74) *Attorney, Agent, or Firm*—Fitzpatrick, Cella, Harper & Scinto

(57) ABSTRACT

According to the present invention, a data transmission device that can transmit data to a destination contained in pre-stored destination information, the data transmission device comprises a determining section that, when the device is instructed to transmit data, determines whether or not destination information contained in the transmission instruction was updated after the last data transmission carried out with reference to the destination information; and a notifying section that, if the determining section determines that the destination information was updated after the last data transmission to the destination, notifies a user having given the transmission instruction that the destination information has been updated.

11 Claims, 36 Drawing Sheets

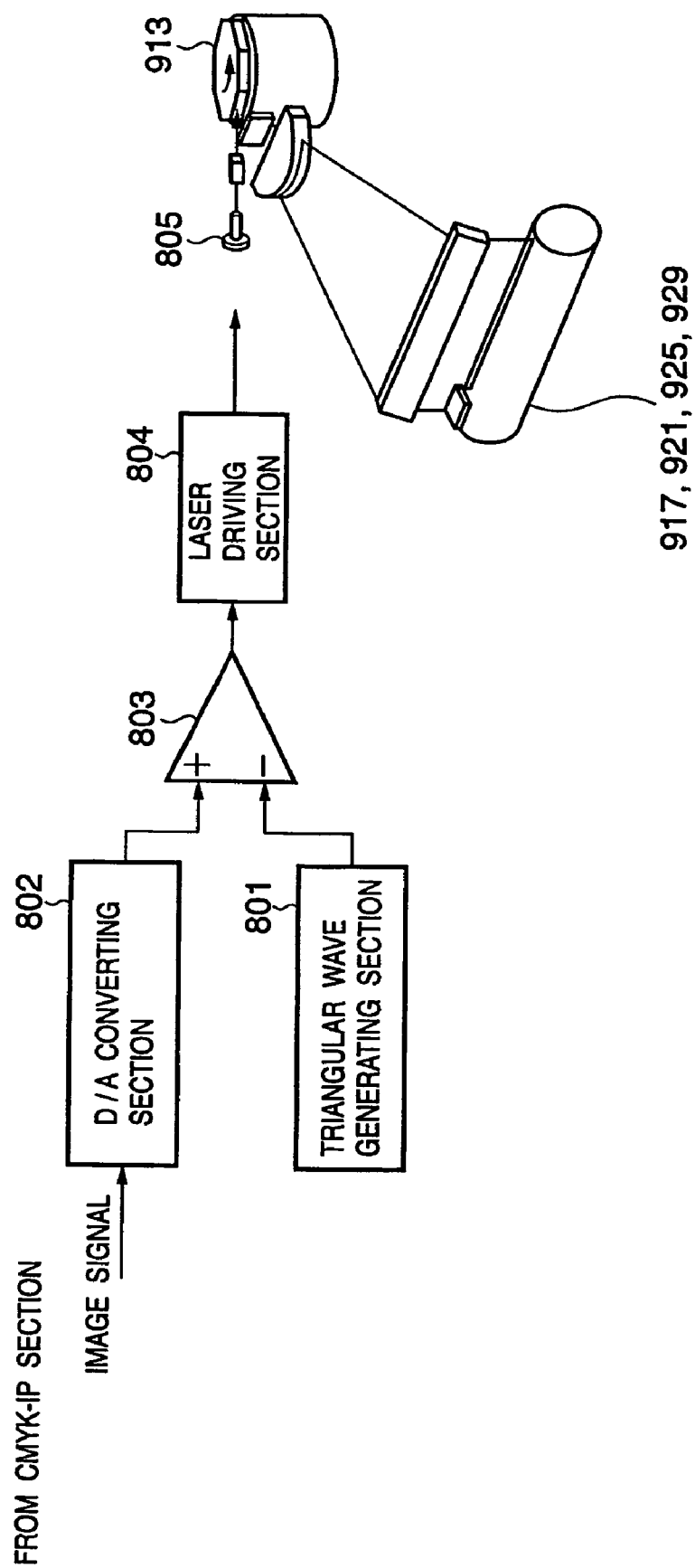

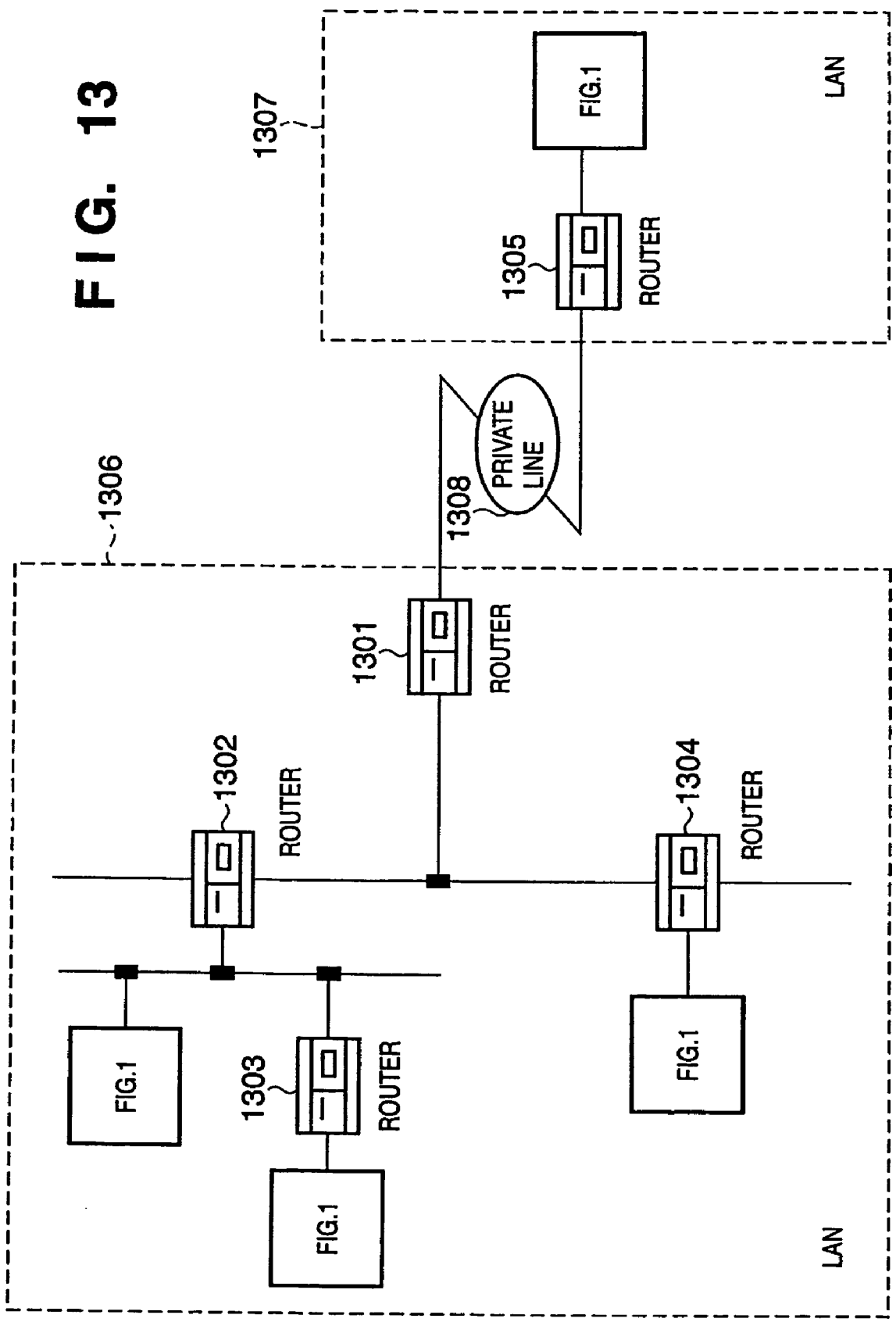

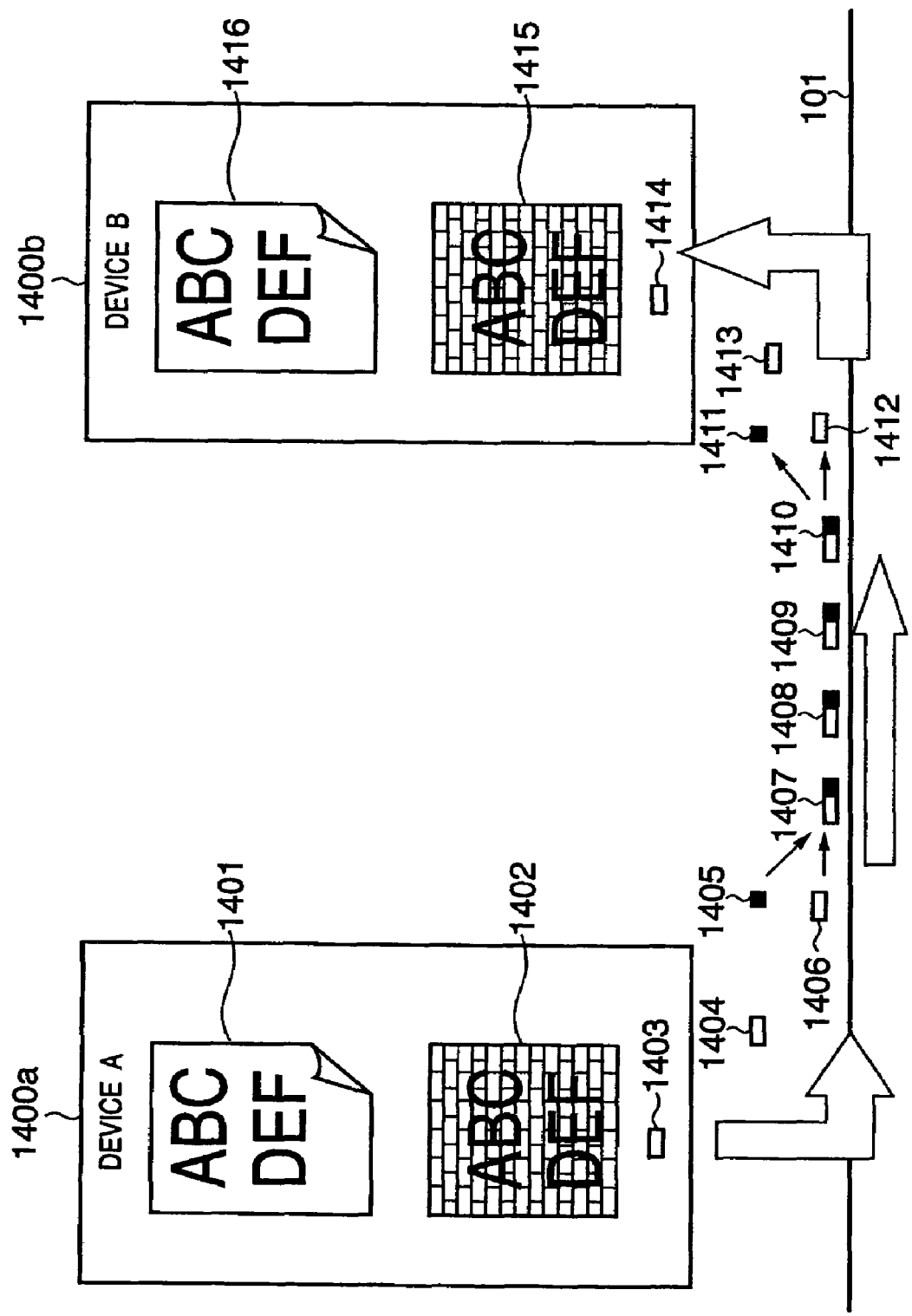

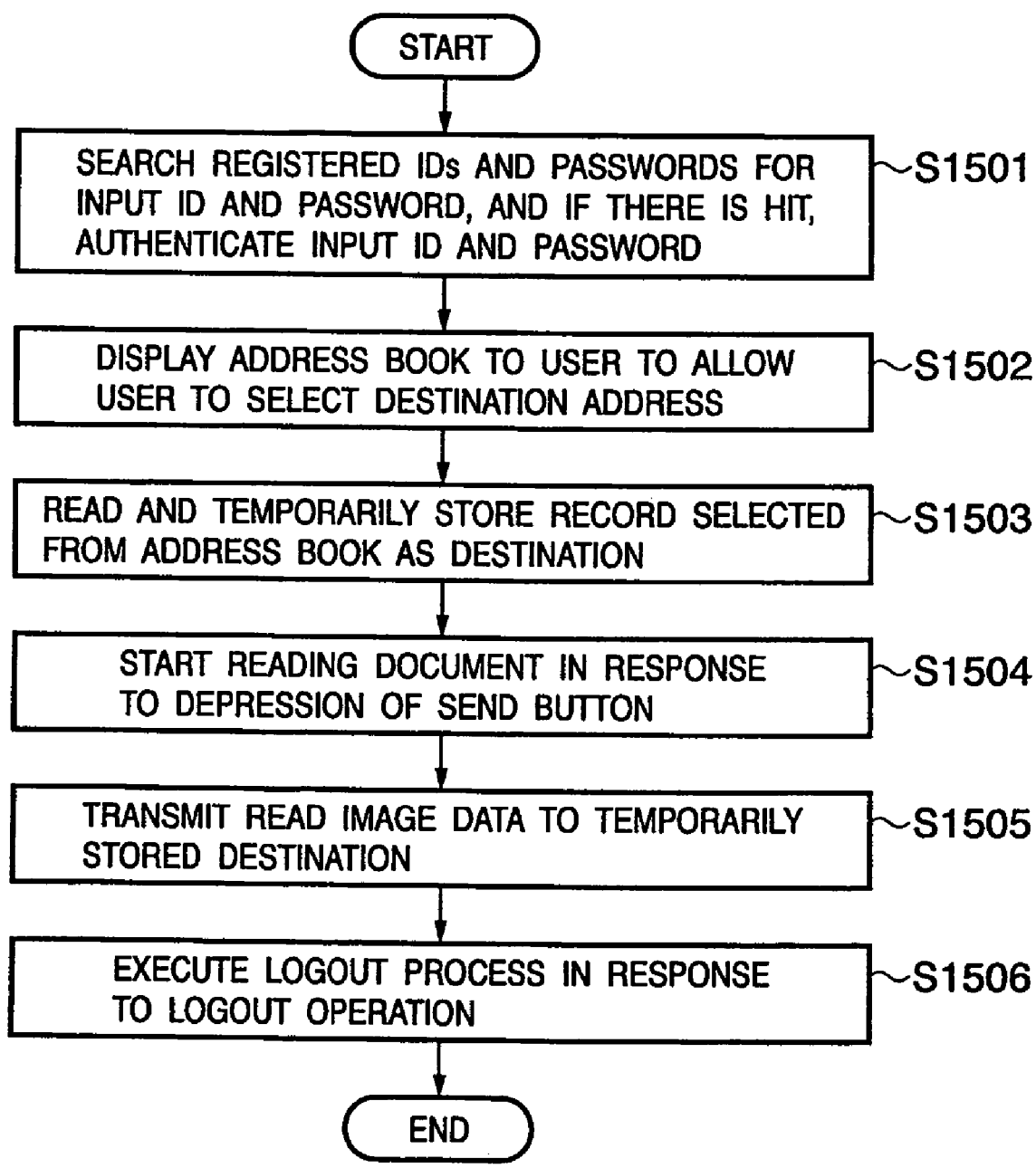

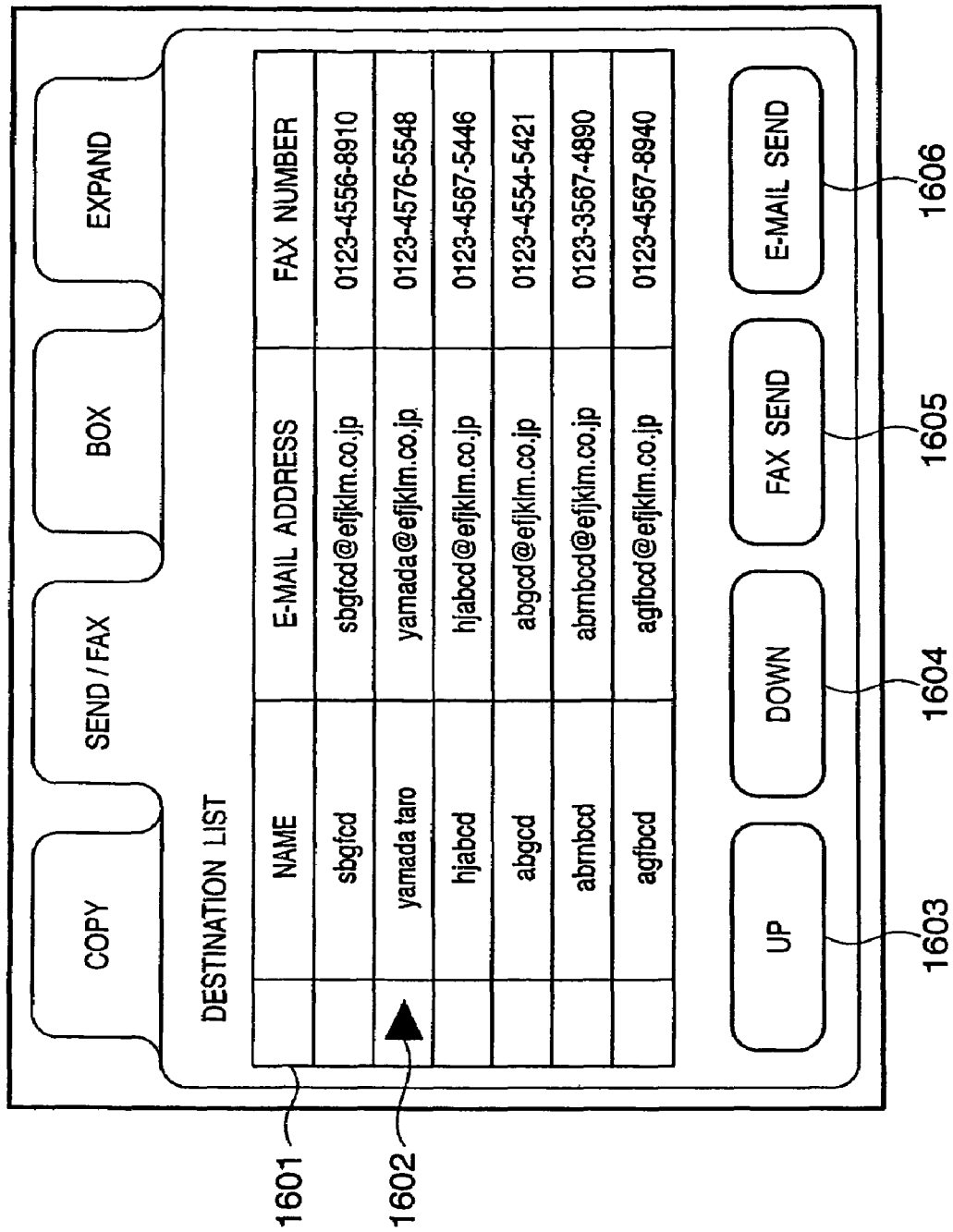

F I G. 24

| COPY | SEND/FAX | BOX | CHANGE ADDRESS BOOK |

CONFIRMATION FOR CHANGES

| | NAME | E-MAIL ADDRESS | FAX NUMBER |
|---|---|---|---|
| OLD | yamada taro | t-yamada@efjklm.co.jp | 0123-4556-8910 |
| NEW | | yamada@efjklm.co.jp | 0123-4556-8910 |

CHANGED ON         : 2004 / 11 / 15
CHANGED BY (ID)    : 9999
CHANGE CONTENT 1 : E-MAIL ADDRESS
CHANGE CONTENT 2 : NONE

CANCEL — 2401

SEND — 2402

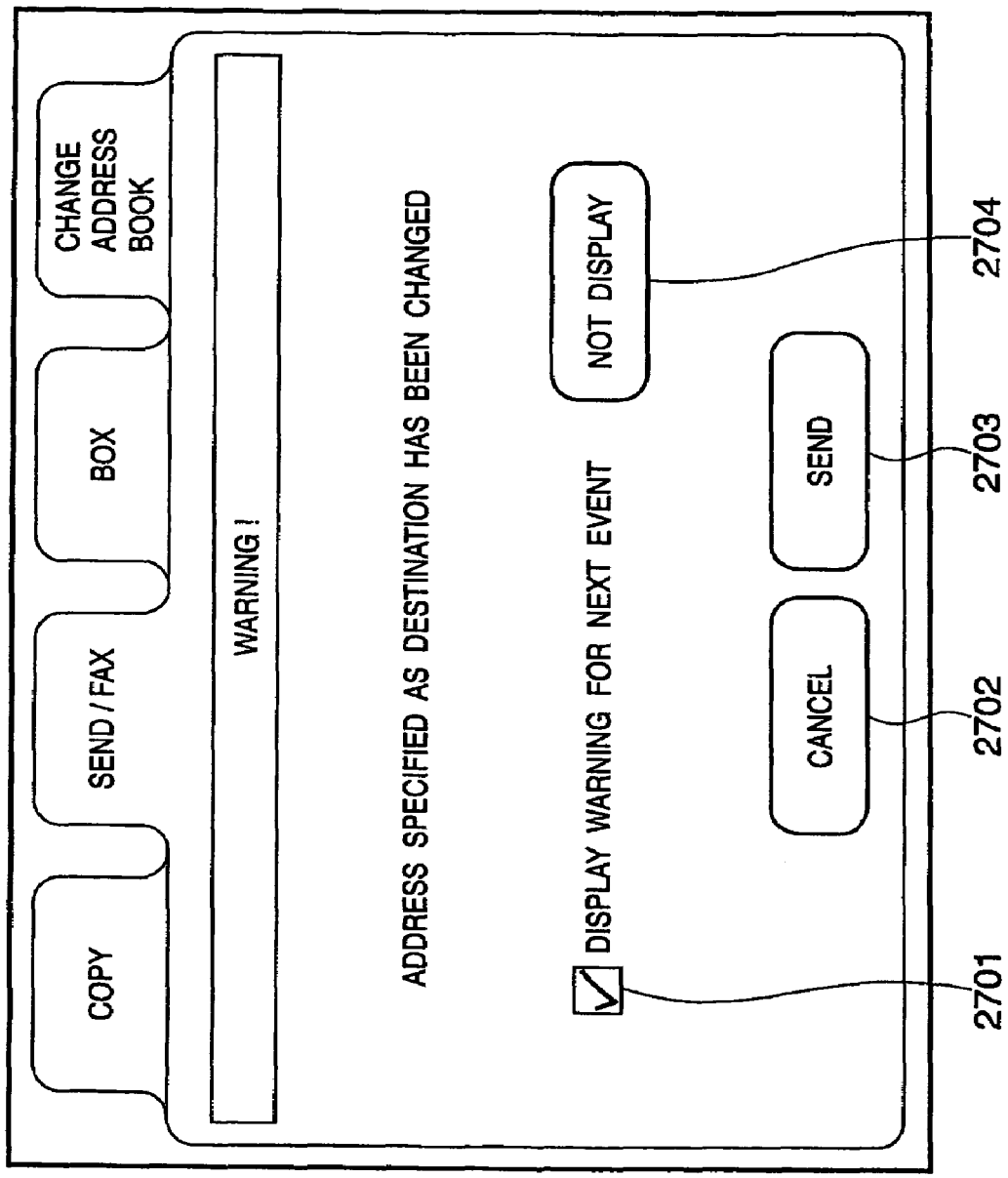

FIG. 28

| NAME | E-MAIL ADDRESS | FAX NUMBER | LAST USE DATE AND TIME | LAST UPDATE DATE AND TIME |
|------|----------------|------------|------------------------|---------------------------|
| | | | | |
| | | | | |
| | | | | |
| | | | | |

| 3201 | 3202 | 3203 | 3204 | 3205 | 3306 |
|---|---|---|---|---|---|
| NAME | E-MAIL ADDRESS | FAX NUMBER | LAST USE DATE AND TIME | LAST UPDATE DATE AND TIME | LAST UPDATER ID |
|  |  |  |  |  |  |
|  |  |  |  |  |  |
|  |  |  |  |  |  |
|  |  |  |  |  |  |

| NAME (3201) | E-MAIL ADDRESS (3202) | FAX NUMBER (3203) | LAST USE DATE AND TIME (3204) | LAST UPDATE DATE AND TIME (3205) | WARNING DISPLAY COUNTER (3406) |
|---|---|---|---|---|---|
| | | | | | |
| | | | | | |
| | | | | | |
| | | | | | |

| 3201 | 3202 | 3203 | 3204 | 3205 | 3506 |
|---|---|---|---|---|---|
| NAME | E-MAIL ADDRESS | FAX NUMBER | LAST USE DATE AND TIME | LAST UPDATE DATE AND TIME | WARNING DISPLAY FLAG |
|  |  |  |  |  |  |
|  |  |  |  |  |  |
|  |  |  |  |  |  |
|  |  |  |  |  |  |

3500

DATA TRANSMISSION DEVICE AND METHOD FOR CONTROLLING THE SAME AND IMAGE READING APPARATUS USING THE SAME

FIELD OF THE INVENTION

The present invention relates to an image processing device that processes images, and in particular, to a device that can transmit input images to another device using a communication path.

BACKGROUND OF THE INVENTION

Not a few multifunction peripheral devices (referred to as MFPs below) have a facsimile function for transmitting image data read from a document via a telephone line and an e-mail transmission function for transmitting image data as an attached document utilizing an e-mail delivery system that uses a network circuit such as the Internet or an intranet; an image input device and a printer are integrated with the multifunction peripheral device. Destinations are prestored in a database inside the MFP. The database is often called an address book. A user wishing to transmit image data can easily specify a destination by registering, in a prepared address book, destination information such as facsimile telephone numbers and e-mail addresses and reading and using any of the information from the address book, increasing convenience.

The address book requires management such as addition or modification. To strictly manage the address book, it is desirable to store the address book in a particular device for centralized management. To achieve this, known methods utilize network connections to allow a special management server to manage the address book as described in Japanese Patent Laid-Open Nos. 2001-285520, 2003-233563, and 2003-108479. Japanese Patent Laid-Open No. 2003-134260 describes a technique for informing users of a change in address information.

The techniques based on such centralized management may result in complicated management and time-consuming modifications. Thus, some MFPs allow address books to be easily changed by a large number of users with no particular administrator designated for maintenance of the address books. It is very convenient for users that they can freely register or change entries in the address book with no particular administrator designated. On the other hand, since the individual users can change the contents of the address book, the changed contents may be inappropriate. For example, an operator may mistakenly or intentionally register a facsimile number or mail address different from that of an original destination, in the address book. If a facsimile letter or a mail is transmitted using the incorrect address book entry, it is sent to an incorrect destination that is different from the user's intended one. This results in a double mistake; the information not only fails to be transmitted to the desired destination but is also sent to the destination to which it should not be transmitted. This inconvenience may occur not only in MFPs but also in data transmission devices such as shared computers or facsimile machines in which, for example, a user agent for e-mails allowing general users to maintain the address book is installed.

SUMMARY OF THE INVENTION

An object of the present invention is to solve the above conventional problems. Thus, according to the present invention, if data is transmitted to a destination registered in an address book, data transmissions to unintended destinations can be prevented while maintaining the convenience of the address book.

The present invention is made in view of the above conventional problems and has the configuration described below.

A data transmission device that can transmit data to a destination contained in prestored destination information, the data transmission device comprising:

a determining section that, when the device is instructed to transmit data, determines whether or not destination information contained in the transmission instruction was updated after the last data transmission carried out with reference to the destination information, and a notifying section that, if the determining section determines that the destination information was updated after the last data transmission to the destination, notifies a user having given the transmission instruction that the destination information has been updated.

Alternatively, the data transmission device comprises:

an address book database that stores destination information in association with destination identifiers, a determining section that, if any destination identifier is specified as a destination for data, determines whether or not destination information associated with the destination identifier was updated after the last data transmission with the destination identifier specified, and a notifying section that, if the determining section determines that the destination information was updated after the last data transmission with the destination information specified, notifies a user having specified the destination identifier that the destination information has been updated.

The present invention can prevent errors in which data is transmitted to an unintended destination and not to a desired one since registered destinations have been changed. The present invention also allows general users to change destination information to maintain the convenience of an address book. Therefore, both convenience and reliability can be achieved.

BRIEF DESCRIPTION OF THE DRAWINGS

FIG. 8A is a block diagram of a PWM section of the image forming apparatus;

FIG. 13 is a schematic diagram of a network environment;

FIG. 14 is a schematic diagram of a data transfer via the network;

FIG. 15 is a flowchart showing a network scan operation;

FIG. 16 is a diagram showing an example of a display screen on the operating section displayed when a destination is selected;

FIG. 24 is a diagram showing an example of a display screen on the operating section which allows the user to check the contents of the change in the destination address;

FIG. 27 is a diagram showing an example of a display screen on the operating section which allows the user to instruct a warning display to be suspended;

FIG. 28 is a diagram showing the configuration of an address book table in accordance with the first embodiment;

FIG. 29 is a diagram showing the configuration of an address book table in accordance with the second embodiment;

FIG. 30 is a diagram showing the configuration of an address book table in accordance with the third embodiment;

FIG. 31 is a diagram showing the configuration of an address book table in accordance with the fourth embodiment.

DETAILED DESCRIPTION OF THE PREFERRED EMBODIMENTS

Summary of the Invention

Figure 32:
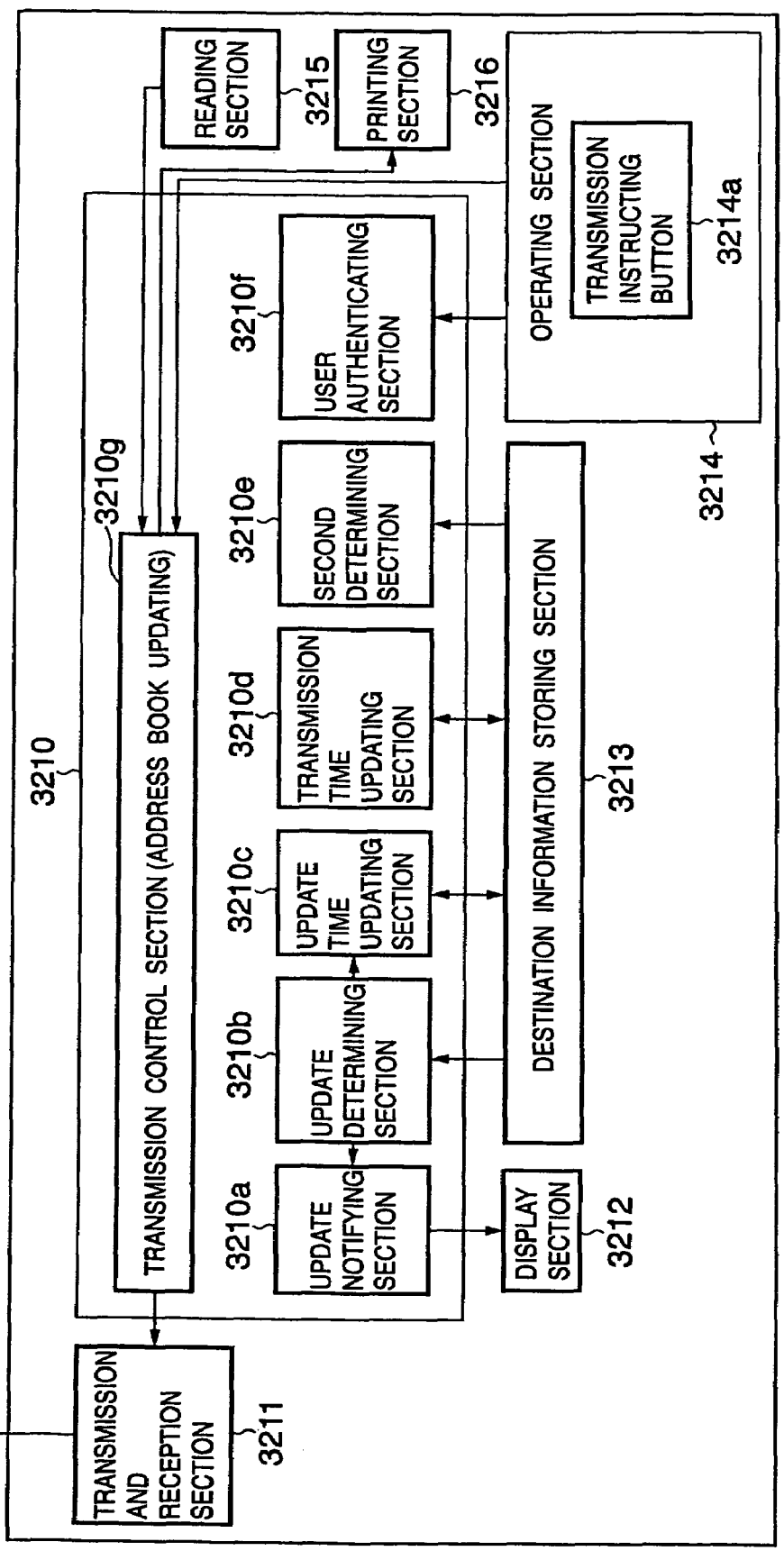
FIG. 32 is a functional block diagram of the present invention.

FIG. 32 shows a schematic block diagram of a data transmission device in accordance with the present invention. In the present embodiment, the data transmission device is implemented using a multifunction copier. In the components shown in FIG. 32, a control section 3210 is implemented by using a processor in the multifunction copier, for example, a core control section (shown in FIG. 7) to execute a relevant program. Of course, the present invention includes a device implemented using hardware.

In FIG. 32, a data transmission device 3201 has the control section 3210, a display section 3212, a destination information storing section 3212, an operating section 3214, a reading section 3215 that reads images, and a printing section 3216 that forms images. The data transmission device 3201 can transmit data to a destination contained in prestored destination information.

The control section 3210 has an update determining section 3210b and an update notifying section 3210a. When instructed to transmit data, the update determining section 3210b determines whether or not destination information contained in the transmission instruction was updated after the last data transmission carried out with reference to the destination information. If the update determining section 3210b determines that the destination information was updated after the last data transmission to the destination, the update notifying section 3210a notifies a user having given the transmission instruction that the destination information has been updated.

The control section 3210 further has a transmission time updating section 3210d and an update time updating section 3210c. The destination information is stored in association with update time information indicative of the last time when the destination information was updated and transmission time information indicative of the last time when data was transmitted to the destination according to the destination information. If data transmission has been carried out in accordance with the transmission instruction, the transmission time updating section 3210d updates the transmission time information on the destination on the basis of the time of the data transmission. If the destination information has been updated, the update time updating section 3210c updates the update time information on the destination on the basis of the time of the update.

The control section 3210 further has an authenticating section 3210f that allows the user to input his or her ID information for authentication and a second determining section 3210e. If the above determining section determines that the destination information was updated after the last data transmission to the destination, the second determining section 3210e determines whether or not the ID information on the user having given the transmission information is the same as the ID information on the user having updated the destination information. The update notifying section 3210a notifies the user having given the transmission instruction that the destination information has been updated if the update determining section 3210b determines that the destination information was updated after the last data transmission to the destination and if the second determining section 3210e determines that the ID information on the user having given the transmission information is different from the ID information on the user having updated the destination information.

The operating section 3214 comprises a non-notification instructing section to which an instruction is input ordering that the update notifying section 3210a not carry out notification.

The transmission control section 3210g transmits data by facsimile communication, e-mail, file sharing, or file transfer.

The data transmission device 3201 also comprises an image reading section 3215 that reads image data. The operating section 3214 has a transmission instruction button 3214a that allows the user to input a transmission instruction on transmission of read image data to a destination contained in prestored destination information.

Description will be given below of hardware and software implementing the configuration shown in FIG. 32.

First Embodiment

Brief Description of the Whole Device

Figure 1:
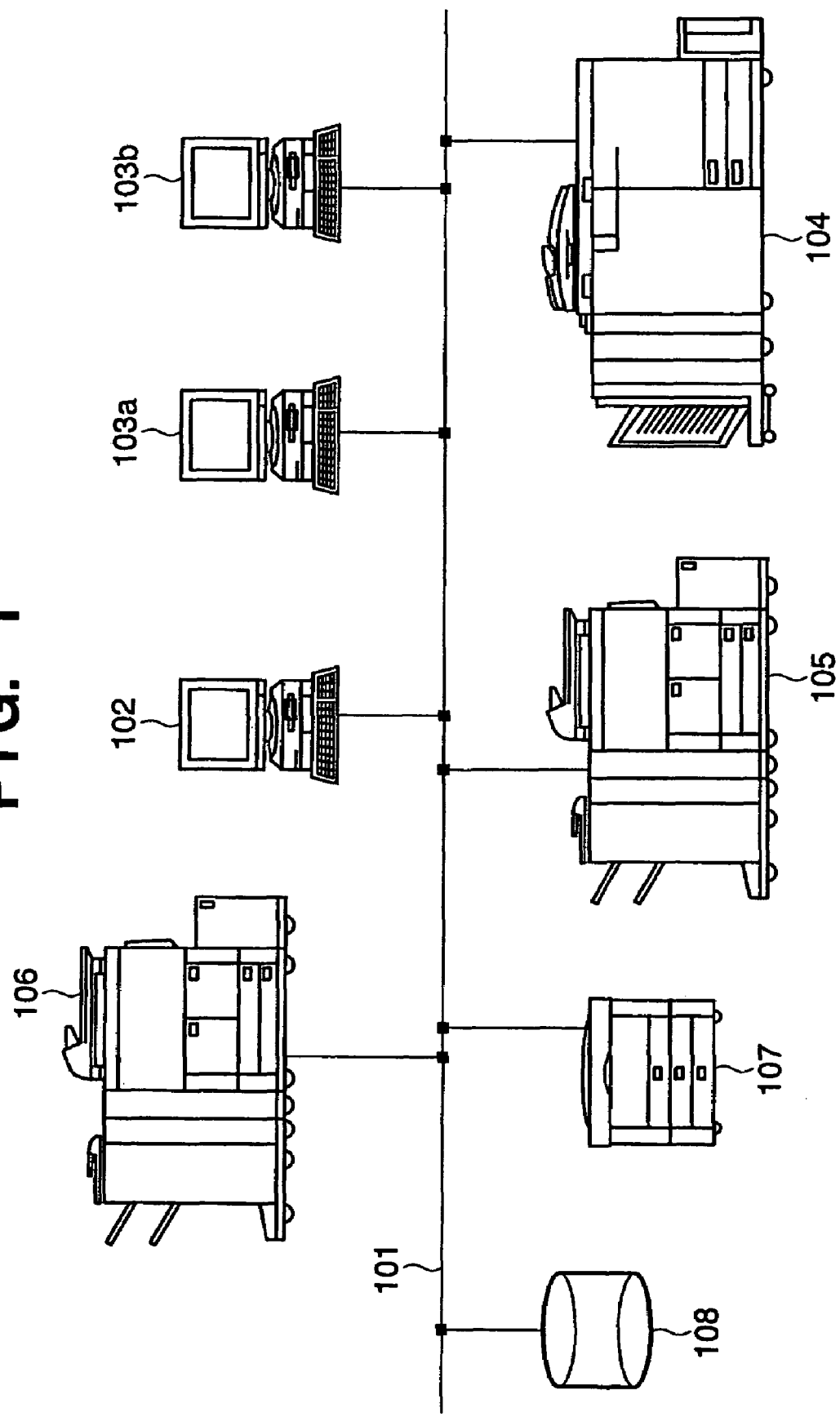
FIG. 1 is a diagram showing the entire system in accordance with the present embodiment.

FIG. 1 shows a schematic diagram of the whole device in accordance with an embodiment of the present invention. Computers 102 and 103 connected to a network 101 serve as a server and a client, respectively. There are actually a plurality of clients 103. FIG. 1 shows clients 103a and 103b but all the clients will be representatively denoted only as 103. Multipurpose network apparatuses 104, 105, and 106 called MFPs (MultiFunction Peripherals) are also connected to the network 101. Reference numeral 104 denotes a color MFP that can, for example, scan and print image data in full colors. Reference numerals 105 and 106 denote monochromatic MFPs that, for example, monochromatically scan and print image data. Network devices each operating to provide a single function are also connected to the network 101 and include a single-function printer 107. These devices are almost equivalent to the above MFPs in terms of operations of printers. Accordingly, these devices will be described in the description of MFPs. MFPs having a facsimile function are individually connected to a public telephone network to enable data to be transmitted by facsimile.

Reference numeral 108 denotes a memory device connected to the network and storing data. The memory device can temporarily save/store various data sent via the network 101. Although not shown in the drawings, the network 101 connects not only to clients, various servers, and MFPs different from those described above but also to scanners, printers, facsimile machines, or other devices.

On the computer 102 (or 103), DTP (Desk Top Publishing) application software is executed to prepare and/or edit various documents and/or figures. The computer 102 (or 103) converts the documents and/or figures prepared into PDL (Page Description Language) data. By using a program called a printer driver on the computer 102 (or 103) to give an instruction, the PDL data is sent to the MFPs 104, 105, and 106 via the network 101 for output. By using a program called a scanner driver on the computer 102 (or 103) to give an instruction, a document placed in the scanner section of the MFP 104, 105, or 106 is read and sent to the network 101 as image data. The image data can then be saved to the memory device 108, displayed on a display of the computer 102 (Or 103), or sent to the MFP 104, 105, or 106 for output.

Each of the MFPs 104, 105, and 106 has communication means for exchanging information with the computer 102 (or 103) via the network 101. Thus, setting information or device statuses on the MFPs 104, 105, and 106 is sequentially transmitted to the computer 102 (or 103). The computer 102 (or 103) has utility software that operates in response to the setting information or device statuses. All the devices including the MFPs are managed by the computer 102 (or 103).

[Configuration of the MFPs 104, 105, and 106]

Next, the configuration of each of the MFPs 104, 105, and 106 will be described with reference to FIGS. 2 to 12. The difference between the MFP 104 and the MFP 105 corresponds to the difference between full colors and monochromatic colors. The full color device often embraces the configuration of monochromatic device in terms of the features other than color processing. Accordingly, the description below will focus on the full color device with a monochromatic section described as required. The MFP 106 is similar to the MFP 105.

Figure 2:
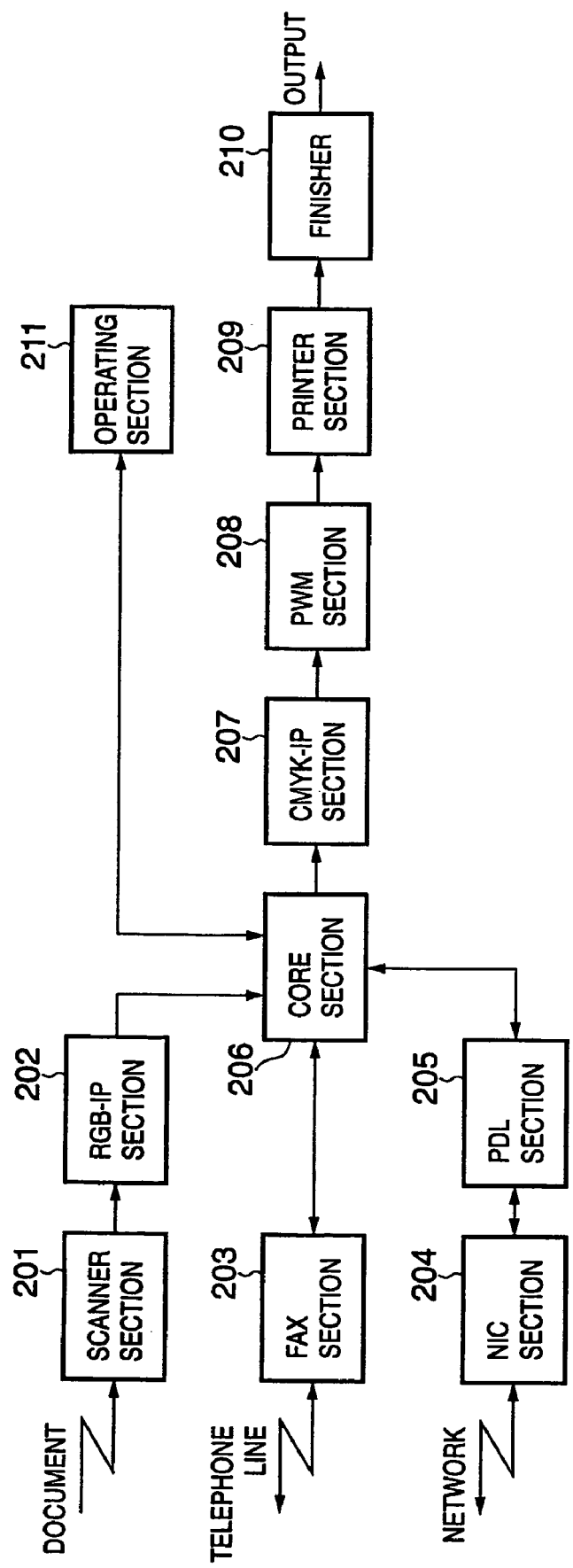
FIG. 2 is a block diagram of the entire image forming apparatus.

FIG. 2 is a block diagram of the whole device. Reference numeral 201 denotes a scanner section that reads images. Reference numeral 202 denotes an RGB-IP section that processes image data. Reference numeral 203 denotes a FAX section typified by a facsimile machine and which transmits and receives images utilizing a telephone line. Reference numeral 204 denotes a NIC (Network Interface Card) section that utilizes the network to transmit image data or device information. Reference numeral 205 denotes a PDL section that converts the page description language (PDL) sent by the computer into image signals. A core section 206 temporarily saves image signals or determines a processing path in accordance with the use of the MFPs 104 and 105. Image data output by the core section 206 is sent to the PWM section 208 via the YK-IP section 207. The image data is then sent to a printer section 209 that forms images. A finisher 210 performing a finishing process then outputs sheets on which images have been fixed. Reference numeral 211 denotes an operating section. The operating section 211 serves as a user interface for settings for the MFPs 104, 105, and 106 which are shown below. That is, the operating section 211 enables (1) selection of functions, (2) various settings, (3) operational state settings, (4) login and logout, and (5) registration and modification of destination data settings (that is, an address book).

Either of two methods, facsimile transmission and network scan, can be selected as a method by which the MFPs 105 and 106 transmit image data read by the scanner section 201 to an external device. For facsimile transmission, the MFPs 105 and 106 function as normal facsimile devices. Network scan involves, for example, a method of using an e-mail to transmit an image file. Image data read by the scanner 201 is processed by the RGB-IP section 202 or the like. The processed image data is then subjected to a compression process or the like as required or requested into an image data file. For example, one image data file is generated for one read page of document image. If, for example, an image data file created is transmitted by e-mail, it is sent out to the network via the NIC 204 as an e-mail attachment file destined for a specified e-mail address. The e-mail address as a destination is read, in accordance with the specified destination, from an address book in which e-mail addresses are registered in association with destination ID information (for example, names). This control is performed by the core section 206. Thus, a program is installed in and executed by the MFPs 105 and 106, the program having functions similar to those of an e-mail user agent program executed in general-purpose computers. However, the MFPs 105 and 106 transmit image data files to be scanned and thus do not require any functions or user interfaces for allowing the user to input the title or text of an e-mail. The network scan can be executed not only by e-mail but also by file transfers based on the FTP (File Transfer Protocol) or a Windows (registered trade mark) file sharing function based on the SMB (Server Message Block) protocol.

[Configuration of the Scanner Section 201]

Figure 3:
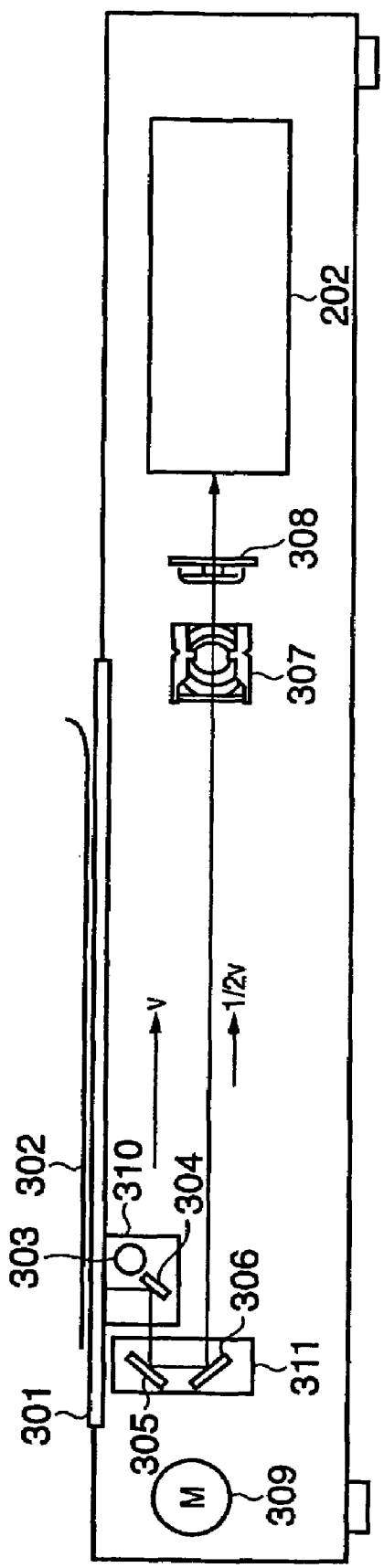
FIG. 3 is a diagram of a scanner section of the image forming apparatus.

The configuration of the scanner section 201 will be described with reference to FIG. 3. Reference numeral 301 denotes copy board glass. First, when the scanner section 201 operates as a copier to carry out document copying, a document 302 to be read is placed on the copy board glass 301. The document 302 is illuminated by a light 303, and an optical system 307 forms an image on a CCD 308 via mirrors 304, 305, and 306. A motor 309 mechanically drives a first mirror unit 310 including the mirror 304 and light 303 at a velocity v. The motor 309 drives a second mirror unit 311 including the mirrors 305 and 306 at a velocity v/2. The entire surface of the document 302 is scanned. An output signal from the CCD 308 is input to the RGB-IP section 202.

[Configuration of the RGB-IP Section 202]

Figure 4:
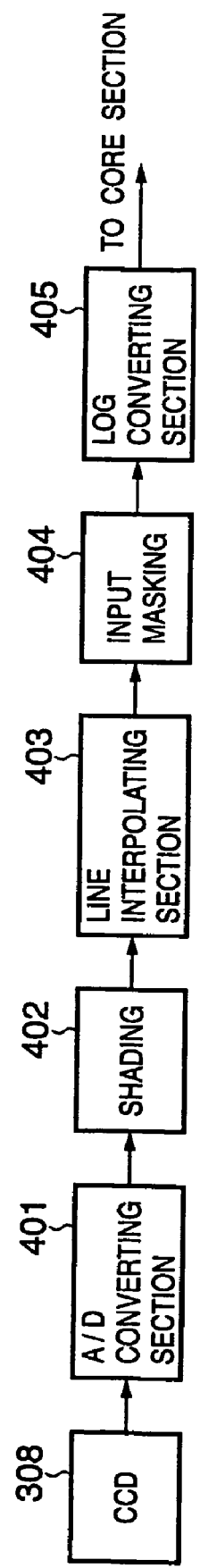
FIG. 4 is a block diagram of an RGB-IP section of the image forming apparatus.

The RGB-IP section (that is, image positioning section) 202 will be described with reference to FIG. 4. The CCD sensor 308 converts an input optical signal into an electronic signal. The CCD sensor 308 is a color sensor with three lines for R, G, and B and inputs an R, G, and B image signals to an A/D converting section 401. The image signals have their gains and offsets adjusted, and an A/D converter converts the adjusted image signals into 8-bit digital image signals R0, G0, and B0 for each color signal. Subsequently, a shading correcting circuit 402 executes a well-known shading correction for each color using read signals for a reference white board. The color line sensors of the CCD sensor 308 are spaced at predetermined intervals. A line delay adjusting circuit 403 thus corrects spatial misalignment in a sub-scanning direction. An input masking section 404 then converts a read color space determined by the spectral characteristics of R, G, and B filters of the CCD sensor 308, into an NTSC standard color space. The input masking section 404 executes a 3×3 matrix calculation using a device-specific constant obtained taking into account various characteristics such as the sensitivity characteristic of the CCD sensor 308 and the spectral characteristic of an illumination lamp. The input (R0, G0, and B0) signals are thus converted into standard (R, G, and B) signals. A luminance/density converting section (LOG converting section) 405 is composed of a lookup table (LUT) RAM to convert an R, G, and B luminance signals into a C1, M1, and Y1 density signals. If the MFP 105 executes monochromatic image processing, a single-color one-line sensor may be used to carry out A/D conversion and shading in a single color and then sequentially execute I/O masking, gamma conversion, and spatial filter processing.

[Configuration of the FAX Section 203]

Figure 5:
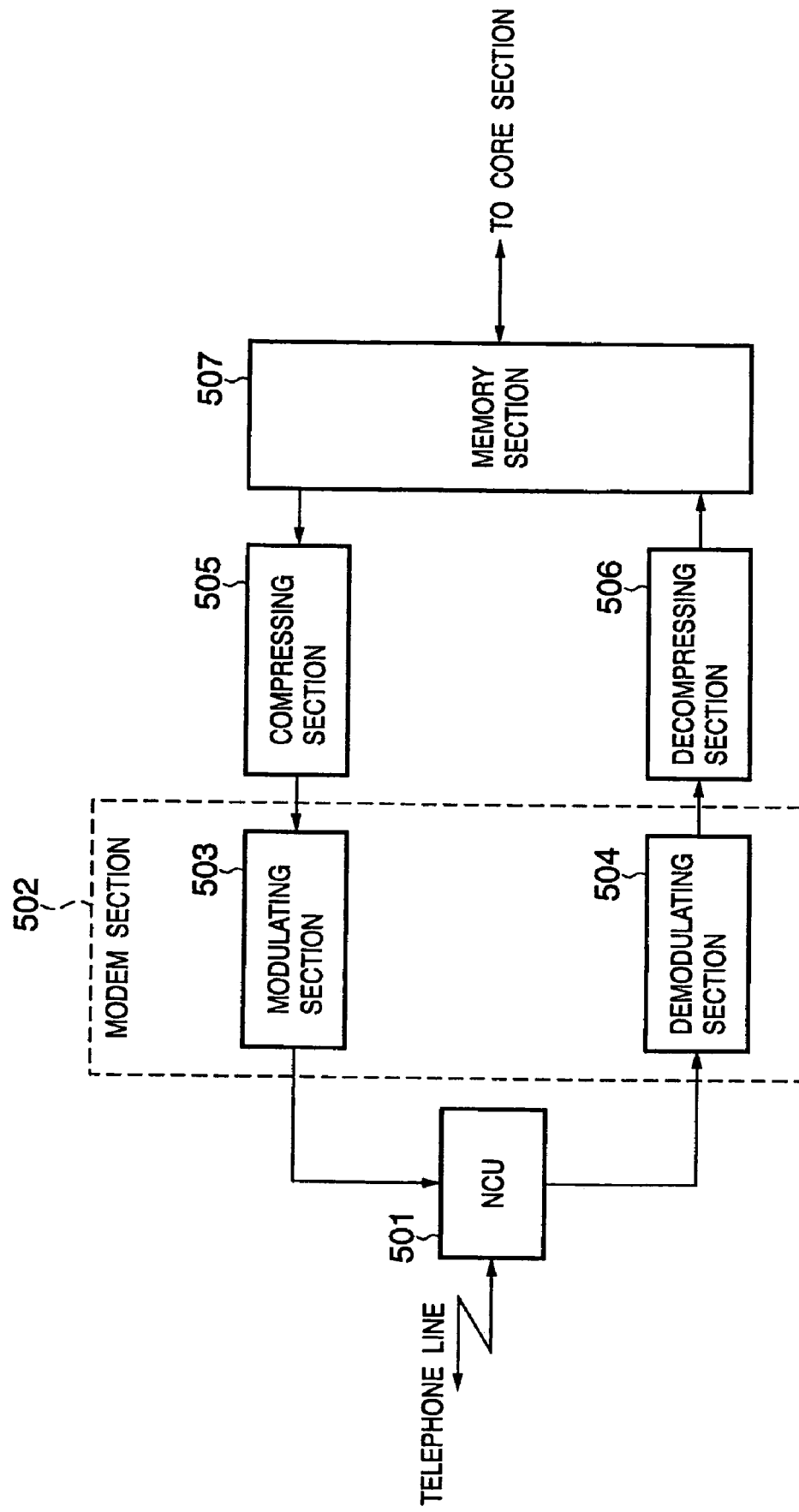
FIG. 5 is a block diagram of a FAX section of the image forming apparatus.

The FAX section 203 will be described with reference to FIG. 5. First, during reception, the NCU section 501 receives data through a telephone line and converts the voltage of the data. A demodulating section 504 in the modem section 502 then performs an A/D converting and demodulating operations. A decompressing section 506 in the modem section 502 then decompresses the data into raster data. In general, a run length method or the like is used for the compression and decompression in the FAX section. The run length method is well known and its description is thus omitted. The image converted into the raster data is temporarily stored in a memory section 507, which then confirms that the image data has no transfer errors and sends it to the core section 206. During transmission, a compressing section 505 uses the run length method or the like to compress the raster image signal from the core section. A modulating section 503 in the modem section 502 then performs a D/A converting and modulating operations. The modulating section 503 then sends the signal to the telephone line via the NCU section 501.

The facsimile number of a destination is specified from the operating section 211 by the user. The facsimile number may be directly specified as a destination. If the user has registered ID information such as the names of destinations in an address book, the facsimile number registered in association with the relevant destination is read from the address book. Data is then sent to this facsimile number.

[Configuration of the NIC Section 204]

Figure 6:
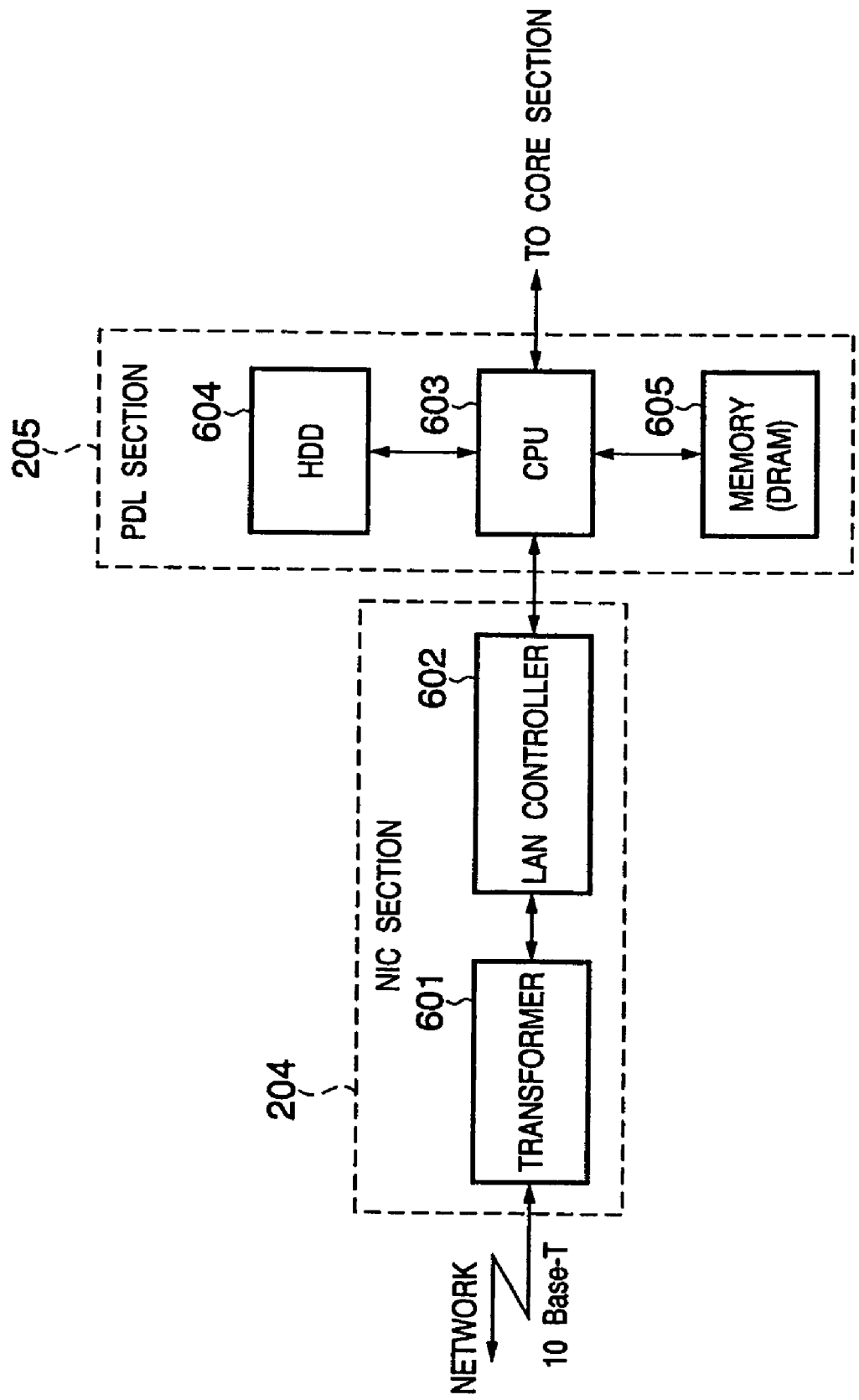
FIG. 6 is a block diagram of a NIC/PDL section of the image forming apparatus.

The NIC section 204 will be described with reference to FIG. 6. The NIC section 204 has an interface function for the network 101 and serves to transmit and acquire information to and from an external device utilizing Ethernet (registered trade name) cables, for example, 10Base-T/100Base-TX. To acquire information from an external device, a transformer section 601 converts the voltage of the information and sends it to a LAN controller section 602. The LAN controller section 602 contains a buffer memory 1 (not shown) and determines whether or not the information is required. The LAN controller section 602 sends the information to a buffer memory 2 (not shown) and then provides the signal to the PDL section 205. To provide information to an external device, the LAN controller section 602 adds required information to the data sent by the PDL section 205. The data is then connected to the network via the transformer section 601.

[Configuration of the PDL Section 205]

Now, the PDL section 205 will be described with reference to FIG. 6. Image data created by application software running on the computer is composed of documents, figures, photographs, and the like. The document, figure, and photograph are composed of a combination of image description elements based on character codes, figure codes, and raster image data, respectively. This is what is called PDL (Page Description Language), typified by the PostScript (registered trade mark) language from Adobe. FIG. 6 shows a part representing a process of convening the PDL data into raster image data. PDL data sent by the NIC section 204 is stored in a computer readable storage medium, such as a hard disk (HDD) 604 via a CPU section 603. In the hard disk (HDD) 604, the data is managed and stored for each job. The CPU section 603 then executes raster image processing (RIP) as required to convert the PDL data into raster image. The converted raster image data is stored in a fast accessible memory 605 such as a DRAM for each of a C, M, Y and K color components, for each job, and for each page. The data is then sent to the core section 206 via the CPU section 603 again in accordance with the situation of the printer section 208.

[Configuration of the Core Section 206]

Figure 7:
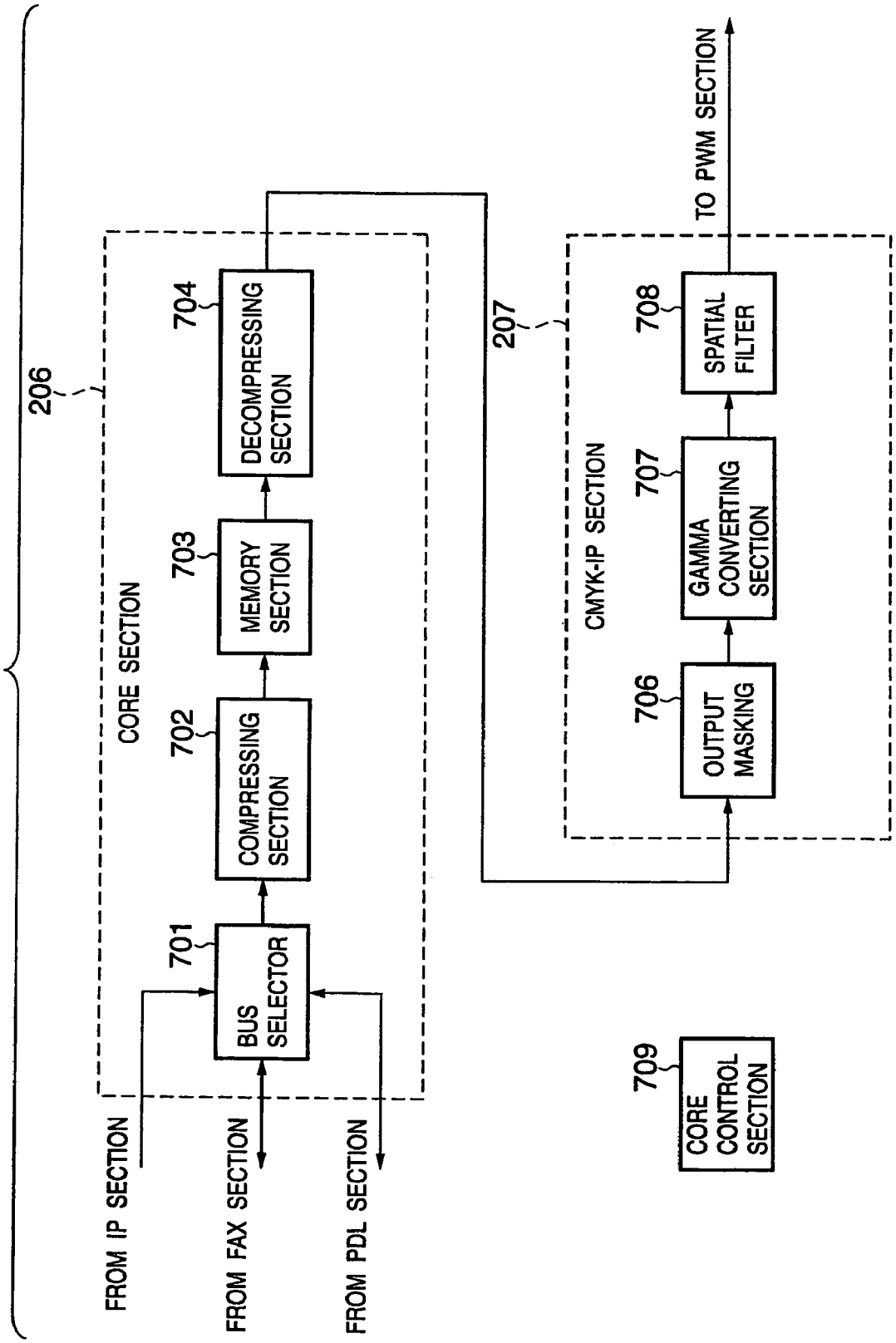
FIG. 7 is a block diagram of a core section/CMYK-IP section of the image forming apparatus.

The core section 206 will be described with reference to FIG. 7. A bus selector section 701 in the core section 206 performs an operation like traffic control for the utilization of the MFPs 104 and 105. That is, the bus selector section 701 switches the bus depending on whether the function to be provided is copying by a standalone scanner, network scan, network print, facsimile transmission/reception, or any of various functions of the MFPs 104 and 105. Specifically, data, particularly image data flows as follows for each function.

Standalone copier: scanner 201→core 206→printer 208
Network scan: scanner 201→core 206→NIC section 204
Network print: NIC section 204→core 206→printer 208
Facsimile transmission function: scanner 201→core 206→FAX section 203
Facsimile reception function: FAX section 203→core 206→printer 208

Image data exiting the bus selector section 701 is sent to the printer section 208 through a compressing section 702, a memory section 703 consisting of a hard disk (HDD) or the like, and a decompressing section 704. A scale changing section 707 enlarges and reduces image data and is used to, for example, transfer a reduced image to another device. A general compressing system such as JPEG, JBIG, or ZIP may be used. Reference numeral 709 denotes a core control section that controls the whole core using control signals (not shown). The control involves the bus switching and interfacing with the operating section and other sections except the core. The core control section is configured to determine the operational statuses of the sections other than the core section. The core control section 709 comprises, for example, a CPU and a memory. The core control section 709 controls the core section by executing a program loaded in the memory. The core control section 709 can also access the memory section 703 and select the bus selector 701.

[Configuration of the CMYK-IP Section 207]

The CMYK-IP section 207 will be described with reference to FIG. 7. Data delivered by the core section 206 enters the output masking/UCR circuit section 707 in the CMYK-IP section 207. The output masking/UCR circuit section 707 uses a matrix calculation to convert a C1, M1, and Y1 signals obtained by the LOG conversion (405), previously described for the RGB-IP section 202, into a Y, M, C, and K signals corresponding to toner colors for the image forming apparatus. The output masking/UCR circuit section 707 then corrects a C1, M1, Y1, and K1 signals read by the CCD sensor 308 and based on an R, G, and B signals, to a C, M, Y, and K signals based on the characteristic of spectral distribution of the toner, which are then output. The gamma correcting section 708 then uses a lookup table (LUT) RAM that takes various characteristics of the toner colors into account to convert the signals into C, M, Y, and K data for image output. The spatial filter 709 applies sharpness or smoothes to the image signals and then sends them to the PWM section 208. Whether the image is monochromatic or colored is determined depending on the balance between the C, M, Y, and K signals.

[Configuration of the PWM Section 208]

Figure 8B:
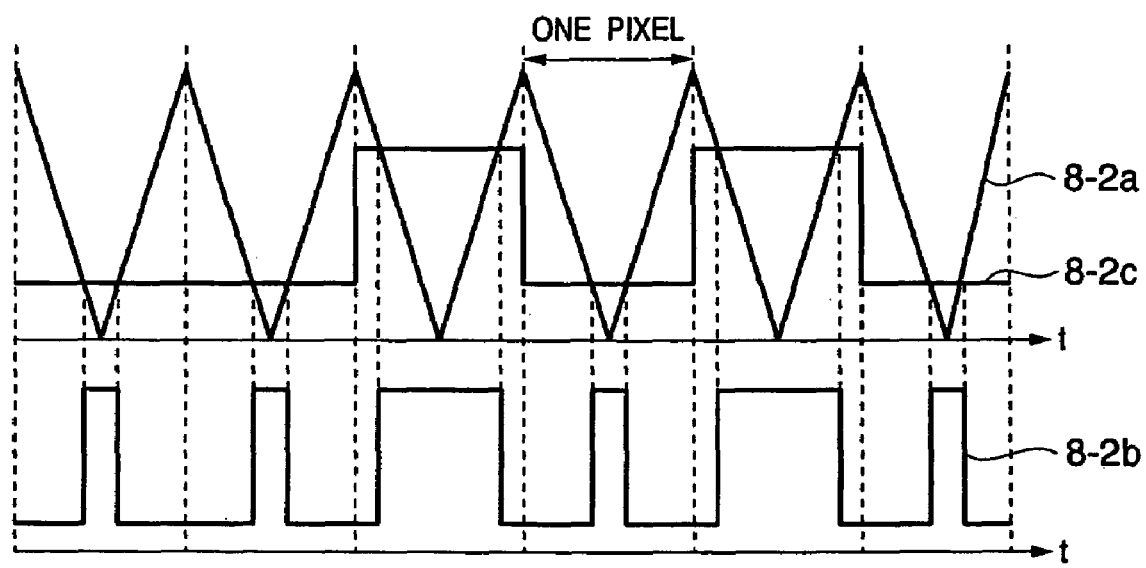
FIG. 8B is a diagram showing an example of a PWM signal in the image forming apparatus.

The PWM section 208 will be described with reference to FIG. 8A. After exiting the CMYK-IP section 207, image data divided into four colors, yellow (Y), magenta (M), cyan (C), and black (K), is formed into respective images upon passing through the respective PWM sections 208 (for the MFP 105, the image data is monochromatic). In FIG. 8A, reference numeral 801 denotes a triangle wave generating section. Reference numeral 802 denotes a D/A converter that converts an input digital image signal into an analog signal. Signals output by these two units are input to a comparator 803 as a triangular wave 8-2a and a rectangular wave 8-2c shown in FIG. 8B. The signals are compared with each other in terms of their magnitude and then subjected to pulse width modulation. The resulting signal like an output signal 8-2b is then sent to a laser driving section 804. The C, M, Y, and K colors are converted into laser beams by respective lasers 805. A polygon scanner 913 scans the laser beams, with which photosensitive drums 917, 921, 925, and 929 are irradiated.

[Configuration of the Printer Section (Color MFP 104)]

Figure 9:
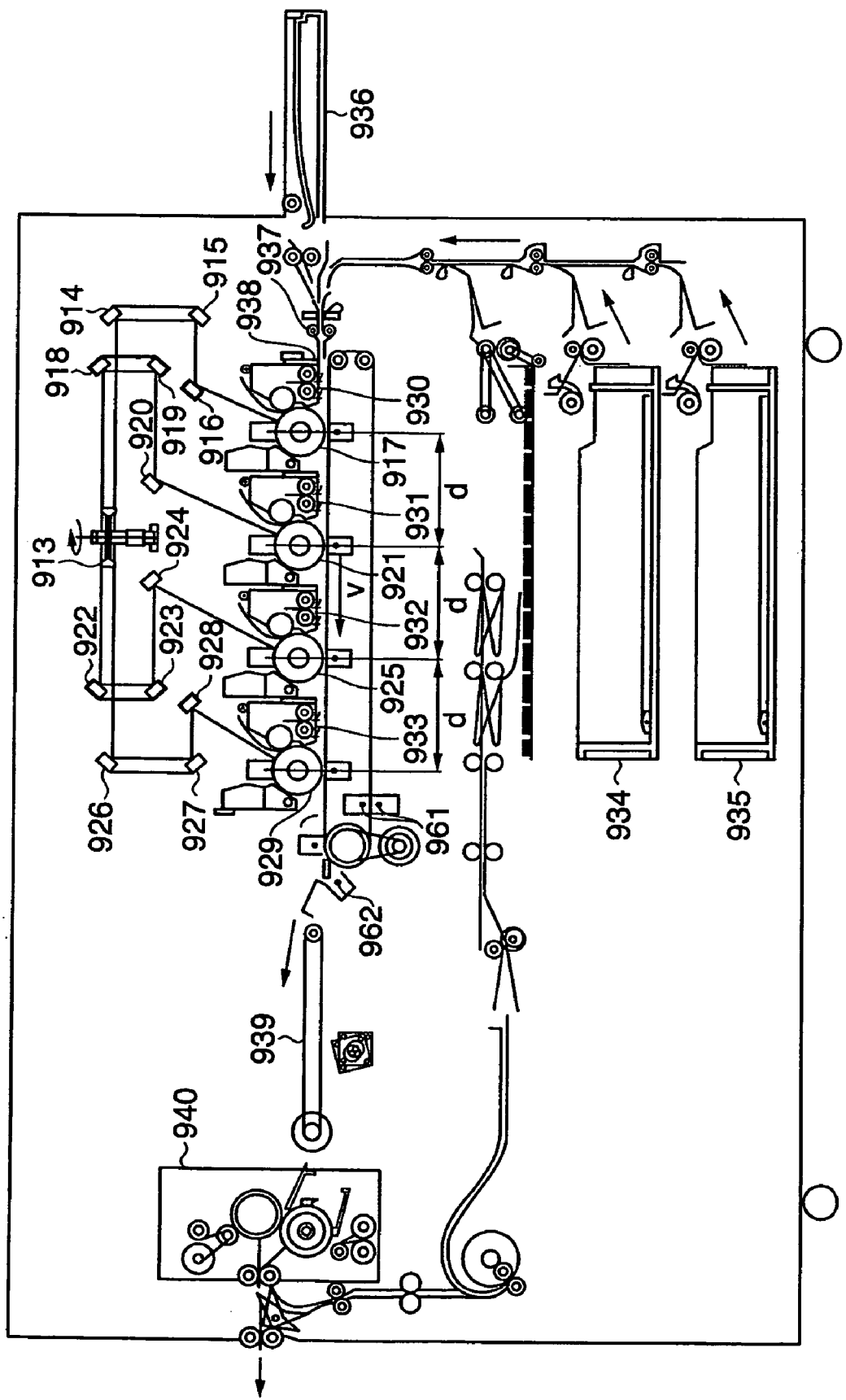
FIG. 9 is a diagram showing a printer section of a color image forming apparatus.

FIG. 9 shows a schematic diagram of the color printer section. Reference numeral 913 denotes a polygon mirror that receives four laser beams emitted by four semiconductor lasers 805. One of the laser beams scans the photosensitive drum 917 through mirrors 914, 915, and 916. The next laser beam scans the photosensitive drum 921 through mirrors 918, 919, and 920. The next laser beam scans the photosensitive drum 925 through mirrors 922, 923, and 924. The next laser beam scans the photosensitive drum 929 through mirrors 926, 927, and 928. On the other hand, reference numeral 930 denotes a developing unit that supplies yellow (Y) toner to form a yellow toner image on the photosensitive drum 917 in accordance with the laser beam. Reference numeral 931 denotes a developing unit that supplies magenta (M) toner to form a magenta toner image on the photosensitive drum 921 in accordance with the laser beam. Reference numeral 932 denotes a developing unit that supplies cyan (C) toner to form a cyan toner image on the photosensitive drum 925 in accordance with the laser beam. Reference numeral 933 denotes a developing unit that supplies black (K) toner to form a magenta toner image on the photosensitive drum 929 in accordance with the laser beam. The four color (Y, M, C, and K) toner images are transferred to a sheet to obtain a full color output image. The sheet is fed from one of sheet cassettes 934 and 935 and a hand tray 936 and passes through a registration roller 937. The sheet is then sucked onto a transfer belt 938 and conveyed. To achieve synchronization with a sheet feeding timing, the color toners are pre-developed on the photosensitive drums 917, 921, 925, and 929. As the sheet is conveyed, the toners are transferred to the sheet. The sheet to which the color toners have been transferred is separated from the drums and conveyed by a conveying belt 939. A fixture 940 fixes the toners to the sheet, which is then discharged. The four photosensitive drums 917, 921, 925, and 929 are spaced at equal intervals (distances d). The sheet is conveyed at a fixed velocity v by the conveying belt 939. The four semiconductor lasers 805 are driven in accordance with this timing synchronization.

[Configuration of the Printer Section (Monochromatic MFP 105)]

Figure 10:
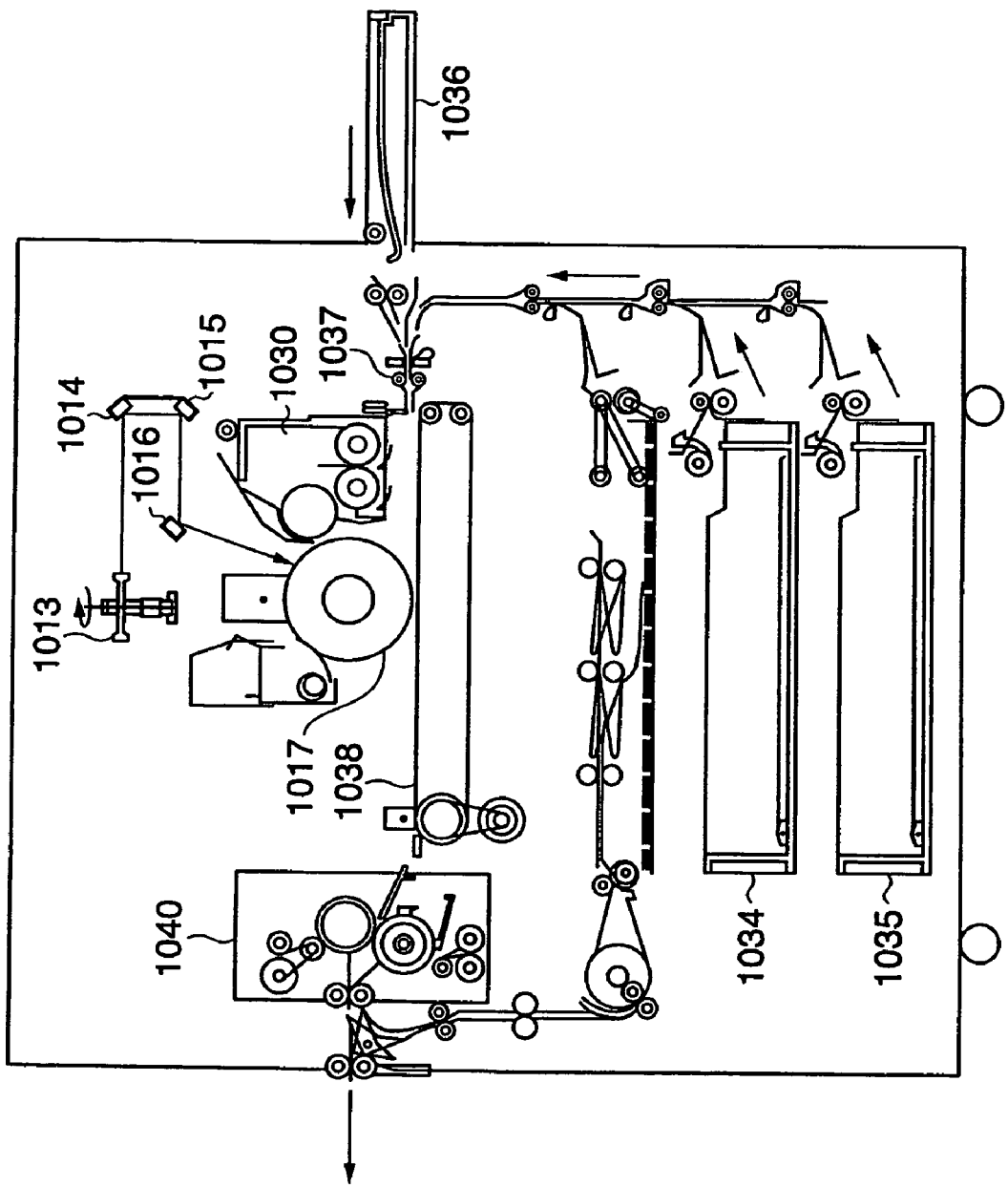
FIG. 10 is a diagram of a printer section of a monochromatic image forming apparatus.

FIG. 10 shows a schematic diagram of the monochromatic printer section. Reference numeral 1013 denotes a polygon mirror that receives laser beams emitted by the four semiconductor lasers 805. The laser beams scan a photosensitive drum 1017 through mirrors 1014, 1015, and 1016. On the other hand, reference numeral 1030 denotes a developing unit that supplies black toner to form a toner image on the photosensitive drum 1017 in accordance with the laser beam. The toner image is transferred to a sheet to obtain an output image. The sheet is fed from one of sheet cassettes 1034 and 1035 and a hand tray 1036 and passes through a registration roller 1037. The sheet is then sucked onto a transfer belt 1038 and conveyed. To achieve synchronization with a sheet feeding timing, the toner is pre-developed on the photosensitive drum 1017. As the sheet is conveyed, the toner is transferred to the sheet. The sheet to which the toner has been transferred is separated from the drum. A fixture 1040 fixes the toner to the sheet, which is then discharged as in the case of color images.

[Configuration of the Operating Section 211]

Figure 11:
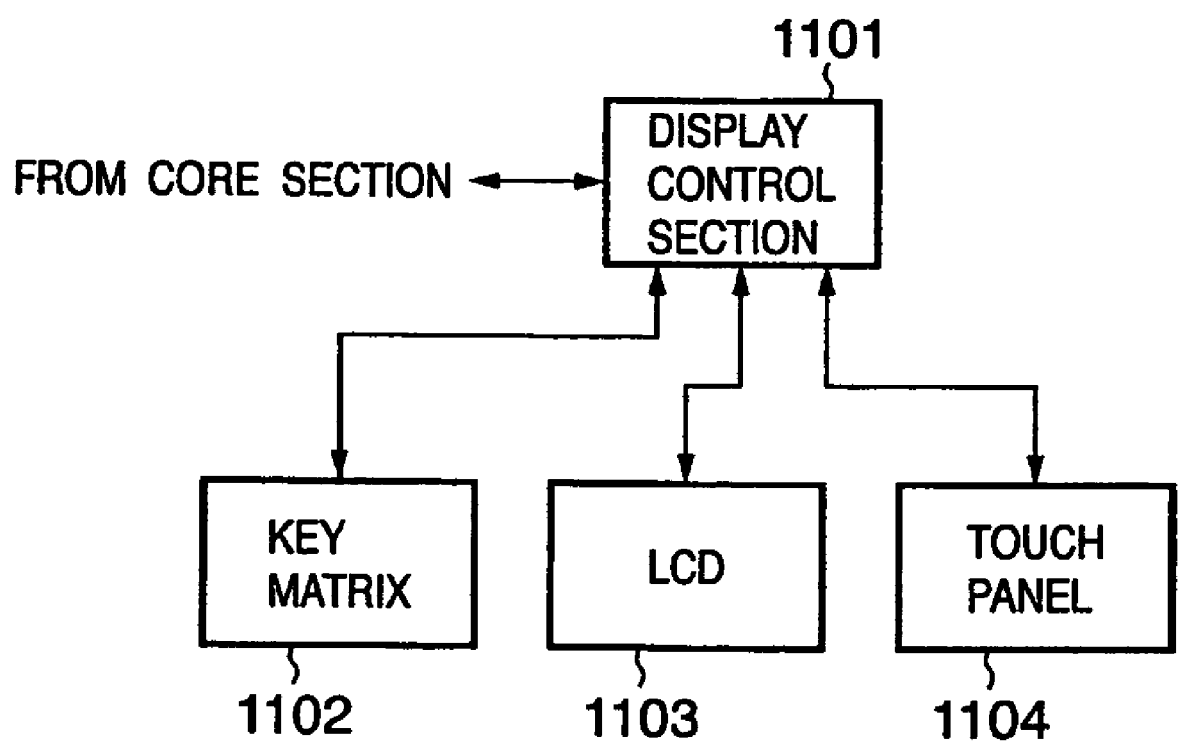
FIG. 11 is a block diagram of an operating section of the image forming apparatus.

FIG. 11 shows the configuration the operating section 211. Reference numeral 1101 denotes an operating section control section that controls a key matrix 1102, an LCD 1103, and a touch panel 1104 described below. In the present invention, a ROM, a RAM, and other peripheral circuits are implemented using microcomputers each composed of one chip. Reference numeral 1102 denotes the key matrix. The key matrix 1102 is composed of a plurality of switches having mechanical contacts. The key matrix 1102 can determine which key the user has depressed, under the control of a program built into the operating section control section. The LCD 1103 is a liquid crystal display that can display characters, figures, and the like. Reference numeral 1104 denotes a touch panel. By depressing the touch panel, the user can acquire coordinate information indicating the depressed position on a plane as a result of an operation by the operating section control section. The touch panel 1104 is integrated with the LCD 1103 so that the user can depress the touch panel while depressing one point on the LCD.

[Configuration of the Finisher 210]

Figure 12:
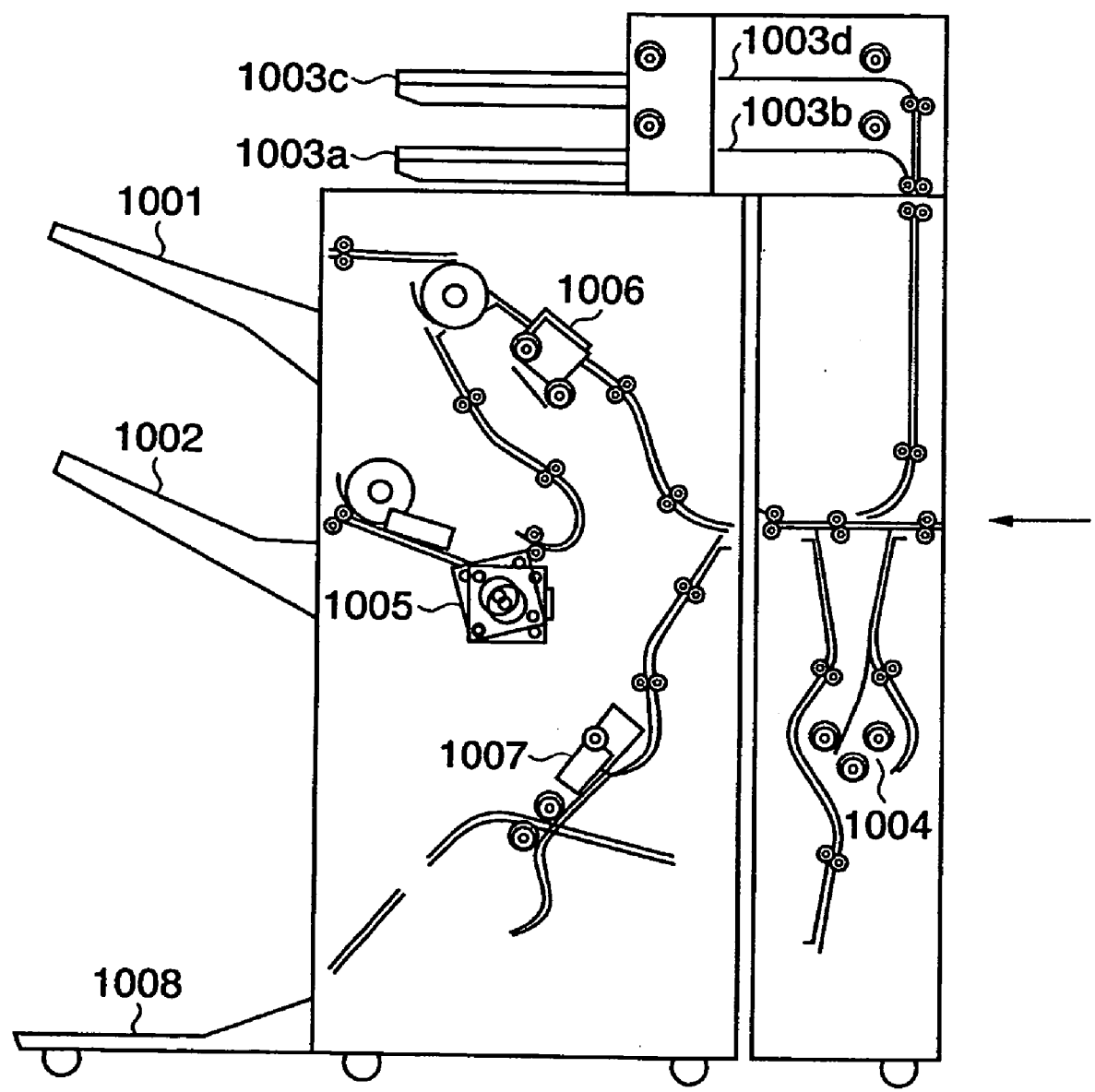
FIG. 12 is a schematic diagram of a finisher section of the image forming apparatus.

FIG. 12 shows a schematic diagram of the finisher. A sheet exiting the fixing section 940 (or 1040) of the printer section 209 enters the finisher 210. The finisher 210 has a sample tray 1001 and a stack tray 1002 which are switched depending on the type of a job or the number of sheets discharged so that the sheets are discharged into the selected tray. Sheets can be sorted using either a bin sort method or a shift sort method in accordance with a function provided to a finisher. In the bin sort method, the finisher has a plurality of bins and distributes the output sheets among the bins. In the shift sort method, an electronic sort function performed by the MFP (described below) is employed. A bin (or tray) of the finisher is shifted inward and outward to sort the output sheets by the jobs. Images corresponding to the respective pages recorded on the output sheets have been sorted using the electronic sort function. The electronic sort function is called collation function. In the electronic sorting function, an output order of pages buffered in a buffer memory can be changed. The buffer memory is prepared in the mass memory described for the core section. In contrast to the sorting function of sorting the sheets by the jobs, a group function sorts the sheets by the pages. If the sheets are discharged to the stack tray 1002, they are stored for the respective jobs before discharge so that they can be bound using a stapler 1005 immediately before discharge.

A Z folder 1004 and a puncher 1006 are provided before the above two trays; the Z folder 1004 folds paper in a Z form and the puncher 1006 opens two (or three) holes in the sheets for filing. The Z folder 1004 and the puncher 1006 execute respective processes corresponding to the type of the job. Inserter trays 1003a and 1003c can execute an interleaving function on sheets placed on them or execute a finishing function on sheets placed on them which have been output by another printer. The sheets in the inserter trays 1003a and 1003c are moved to the trays 1003b and 1003d. A saddle stitcher 1007 is used to fold paper in two and to bind it in the middle in a booklet format. In this case, the sheets are discharged into a booklet tray 1008. Although not shown in the figures, it is possible to carry out binding with glue or cutting for aligning the end surfaces of the sheets located opposite to the bound end surfaces after binding.

[Network 101]

Next, the network 101 will be described. As shown in FIG. 13, the network 101 is composed of configurations (network segments) such as the one shown in FIG. 1. The network segments are connected together using devices called routers, to constitute a further network called LAN (Local Area Network) of course, each of the network segments shown in FIG. 1 is a LAN. A LAN 1306 is connected to an edge router 1305 of another LAN 1307 through an edge router 1301 and a private line 1308. A large number of LANs can thus be connected together via a wide area connection network to construct a vast network. The network shown in FIG. 13 is closed with particular LANS connected through private lines. However, by connecting the LANs together via the Internet backbone instead of directly connecting the LANs together, it is possible to connect the LANs to an unspecified number of LANs connected to the backbone.

Now, data flowing through the network will be described with reference to FIG. 14. Data 1401 (for example, image data read by the scanner) is present in a destination device A 1400a (for example, the MFP 104, 105, or 106). The data may be an image, the PDL, or a program. To be sent to a receiving device B 1400b (for example, the computer 102 or 103 or network storage 108) via the network 101, the data 1401 is divided into images as shown at 1402. Destination addresses (the IP addresses of the destinations if the TCP/IP protocol is utilized) called headers 1405 are added to the resulting divided data 1403, 1404, and 1406, which are sequentially passed onto the network 101 as packets 1407. When the address of the device B matches the header 1411 of a packet 1410, data 1412 is separated and reproduced in the same state as that in the device A.

For an e-mail, the destination address includes not only an IP address but also a TCP port number and an e-mail address provided for the e-mail. Transmission of an e-mail requires a data format specified in, for example, the SMTP. Transmitted data packets are received by a device with a specified IP address and processed by an application with a specified TCP port number. The e-mail is then distributed to a mailbox of a specified mail address.

To transfer a file using the FTP (File Transfer Protocol) or execute Windows (registered trade mark) file sharing using the SMB (Sever Message Block) protocol, it is necessary that the transmitting MFP input or pre-specify the IP address, folder, and login ID and password of a transfer destination computer or a computer sharing the file. A method for operating the MFP is almost the same as that used for transmissions based on e-mails. The only difference is that the user uses the operating section to select either an e-mail transmission or a file transmission (the name displayed on the operating section if file sharing based on the FTP or SMB protocol is used). In the receiving computer, the transmitted image data file is stored in the specified folder. In general, ports Nos. 25, 21, and 445 are used as TCP port numbers used for the SMTP, FTP, and SMB protocol, respectively. For file sharing, the NBT (NetBIOS over TCP/IP) protocol may used instead of the SMB. In this case, TCP ports Nos. 137 to 139 are generally used.

[Printer Driver]

Now, description will be given of a process in which the computer 102 (or 103) uses the printer driver to transmit image data to the printer. The printer driver is software prepared in accordance with the type of the printer. The printer driver comprises a GUI that gives an instruction on a print operation. Using the GUI, the user can specify desired setting parameters to send a desired image to a destination such as a printer. A GUI window of the printer driver contains, as a setting item, a destination selection column that allows the user to select a destination as a target. The destination is generally the MFP 104 or 105 or the printer 107. However, an image may be transferred to the memory 108 so as to be saved to it. A page setting column allows the user to select an output page from a job. The page setting column is used to determine which page in an image is to be output which is created by application software running on the computer 102 (or 103). A sheet number setting column allows the user to set the number of sheets required. A property key is a software button used to make detailed settings for the destination device selected in the destination selection column. Clicking the property key enables setting information specific to the device to be input on another screen. This screen enables special image processing, for example, more detailed color reproduction or sharpness adjustment to be carried out by changing parameters for the gamma converting section 707 or spatial filter section 708 in the CMYK-IP section 207. A finishing setting column has different setting items depending on the selected printer. For example, this column enables settings for stapling, sorting, and the like.

Clicking the right side of the destination selection column displays a list of printers and MFPs available for printing. To achieve this, the computer must search for the printers on the network. What is called a directory service is utilized to search for the MFPs and printers on the network. The directory service is, in other words, a telephone directory for the network and stores various pieces of information. A specific example of a directory system using the directory service is the LDAP (Lightweight Directory Access Protocol). The specifications for the LDAP are described in RFC (Request For Comments) 1777, standard specifications issued by the IETF (Internet Engineering Task Force).

By using the directory service to search for the devices connected to the network, it is possible to obtain a list of the network addresses of the devices available on the network. The computer 102 on the network 101 functions as an LDAP server to store all the information on the devices on the network. The computer can search for the desired device by inquiring of the LDAP server rather than carrying out the search by itself. By registering the positional information on the devices in the LDAP server in addition to information on the provisions and statuses of the devices, it is also possible to search for devices close to the computer or a printer which is closest to the desired printer and which has the desired functions. The positional information is defined as the distances from a reference point in an X and Y directions for each floor and includes floor information. For example, for a device located 3 m away from a corner as a reference on the second floor in the X direction (the distance may be expressed as the third post) and 5 m away from the same corner in the Y direction, the position is expressed as 3X5Y2. The driver allows a list of the printers to be displayed in the destination selection column 1602 by inquiring of the LDAP server. After finishing the desired settings, the user uses an OK key 1605 to start printing. To cancel the printing, the user uses a cancel key 1606.

[Description of Network Utility Software]

Description will be given of utility software operating on the computer 102 (or 103). A standardized database called MIB (Management Information Base) is constructed in a network interface part in each of the MFPs 104, 105, and 106. The MIP communicates with computers on the network via a network management protocol called SNMP (Simple Network Management Protocol). This enables management not only of the MFPs 104 and 105 but also of the scanners, printers, or fax machines connected together on the network.

On the other hand, a software program using the MIB operates on the computer 102 (or 103) to enable required information to be exchanged via the network utilizing the SNMP and MIB. The software program can obtain information identifying a device by acquiring MIB information such as if PhysAddress or sysObject ID defined in an RFC 1213 or hrDevice ID defined in an RFC 1514. Information on the provisions, capabilities, or the like of the device is defined as a private MIB. The provision information includes whether or not any finisher is connected. The software program can acquire this information.

By acquiring MIB information, devices on the network can communicate with each other to acquire information on the status, capabilities, and the like of each other. The computer 102 periodically communicates with devices on the network or uses transmissions from the devices to always identify the functions, status, and the like of each device. Since WEB servers are constructed on the basis of MIB data collected from the devices, the computer 103 can determine the status of each device even by accessing the computer 102 using well-known browsing software based on the HTTP.

It is possible to pass all the print jobs to the computer 102, which then loads the jobs into the respective printers, analyzes the user's name and section, file name, number of pages, job contents, and the like of each job, and stores the number of printing operations, the total number of pages, and the like for each user or section. It is also possible to manage and operate the devices and jobs on the network by also adding up the numbers of prints and errors, the current remaining amounts of paper and toner, and the like for each device.

The computer 102 also converts a print Protocol. When the user attempts to execute printing on the computer 103 using the IPP (Internet Printing Protocol) though the MFP 105 supports only the LPD, the computer 102 can automatically convert the IPP into the LPR protocol and pass the job to the MFP 105. Printed data is stored in the memory 108 and automatically deleted by a server on the basis of parameters such as the remaining amount of memory or the date.

[Address Book]

An address book table (also simply referred to as an address book) is stored in the memory section 703 in the core section 206 inside the MFP 106. The address book table is configured so that the core control section 709 can write and read data to and from the address book table. Control by the core control section 709 enables data optimized for the relevant contents or display purpose to be transferred to the operating section 211. The LCD 1103 can display the transferred data. FIG. 28 shows an example of the configuration of an address book table 3200. The address book table 3200 is composed of one or more records in each of which destination information is stored in association with one address. The destination information includes a name 3201, an e-mail address 3202, a fax number 3203, a last use date and time 3204, a record update time (last update date and time) 3205 and the like. Other information (user's ID number or section, comments, or other attributes) may be stored in the records. By operating the operating section 211, the user can add new entries to or delete existing entries from the address book table 3200, or change existing entries in the address book table 3200. To achieve this, the core control section 709 executes a program that implements an operational sequence for maintaining an address book in accordance with inputs from the operating section 211. Thus, when the user specifies an entry (record) to be added or deleted or a field to be changed, the contents of the address book table are changed in accordance with the specification. This procedure will be described with reference to FIG. 17A or the like.

[Description of a Basic Scan Operation]

With reference to the flowchart in FIG. 15, a detailed description will be given of a network scan or facsimile transmission operation performed by the present device. First, the user uses the operating section of the MFP to log into the device. For the login, for example, the user uses the keyboard to input a number (login ID) already provided for the user. The user can further input a preset password corresponding to the login ID. Subsequently, the user can operate the MFP. In step S1501, for example, the registered IDs and passwords are searched for those input for the login by the user. If there is a hit, the user is allowed to log into the device. The process proceeds to the next step. If there is no hit, the user is not authorized to log into the device. The device thus waits for another login attempt and repeats step S1501. In step S1502, the address book is displayed on the operating section so as to be utilized by the user. The user is then allowed to select a destination address on the screen. The user having succeeded in the login sets documents to be transmitted in the MFP.

Once the user selects a destination, the record corresponding to the selected destination is read from the address book table 3200 and temporarily stored as an address in step S1503. It is assumed that the desired function ("Send/Fax" in accordance with the present invention) is selected before the destination is selected. This selection may be carried out in, for example, step S1502. FIG. 16 shows an example of a screen displayed on the operating section 211 to allow the user to select a destination. In FIG. 16, reference numeral 1601 denotes the contents of the address book in which information on the destination addresses is stored. In this example, the last use data and time and last update date and time in the address book table 3200 are not displayed. Symbol 1602 denotes an item currently selected as a destination. This symbol, that is, the destination, can be moved upward using an up button 1603. It can also be moved downward using a down button 1604. If the operating section 211 is a touch panel, the user can select the desired destination by touching that part on the touch panel. A plurality of destinations may be selected.

In step S1504, the MFP starts reading a document in response to the user's transmission start instruction, that is, the depression of a fax send button 1605 or an e-mail send button 1606 shown in FIG. 16.

In step S1505, image data (referred to as document image data below) is transmitted which has been created by reading the document. If the fax send button 1605 has been depressed, the read document image data is transmitted to the number specified by the fax number item for the destination, as fax data. This process conforms to a normal facsimile format and transmission procedure. If the e-mail send button 1606 has been depressed, the read image is transmitted to the address specified by the e-mail address item for the destination, as an e-mail attachment file. This procedure also conforms to a normal e-mail format and transmission procedure.

In step S1505, a logout process is executed in response to a logout operation from the MFP performed by the user. The user performs this operation by depressing a logout key (not shown) attached to the operating section 211. Description has been given of the network scan operation in the MFP 106.

This operation involves the object to be achieved by the present invention. Specifically, data may be unconditionally transmitted to an address selected from the address book, and this problem is solved by an address check process described below.

[Address Book Update Check Process]

Figure 17A:
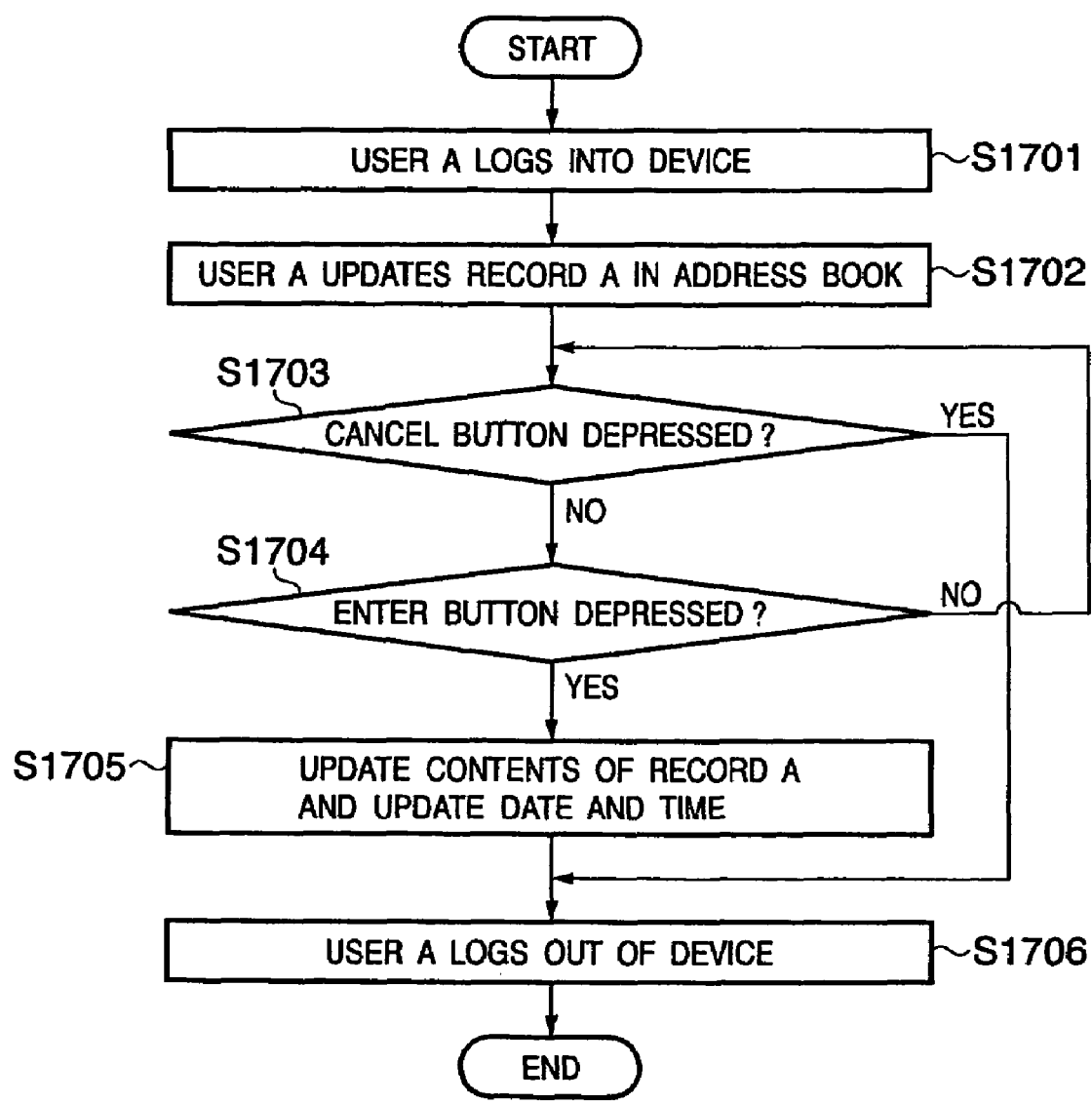
FIG. 17A is a flowchart showing an operation of a first embodiment of the present invention.

Now, description will be given of an operation of giving warning if data in the address book is changed after the last use. First, with reference to the flowchart in FIG. 17A, description will be given of an operation performed to change the address book in which information on destinations is stored. The procedure in FIG. 17A is executed by, for example, the core control section 709.

In step S1701, when a user A operates the operating section to log into the device, a login process is executed in response to the operation. The contents of the process are similar to those in step S15 in FIG. 15. For the login, for example, the user uses the keyboard to input the number (login ID) already provided for the user. The user can further input the preset password corresponding to the login ID. Subsequently, the user can operate the MFP.

Figure 18:
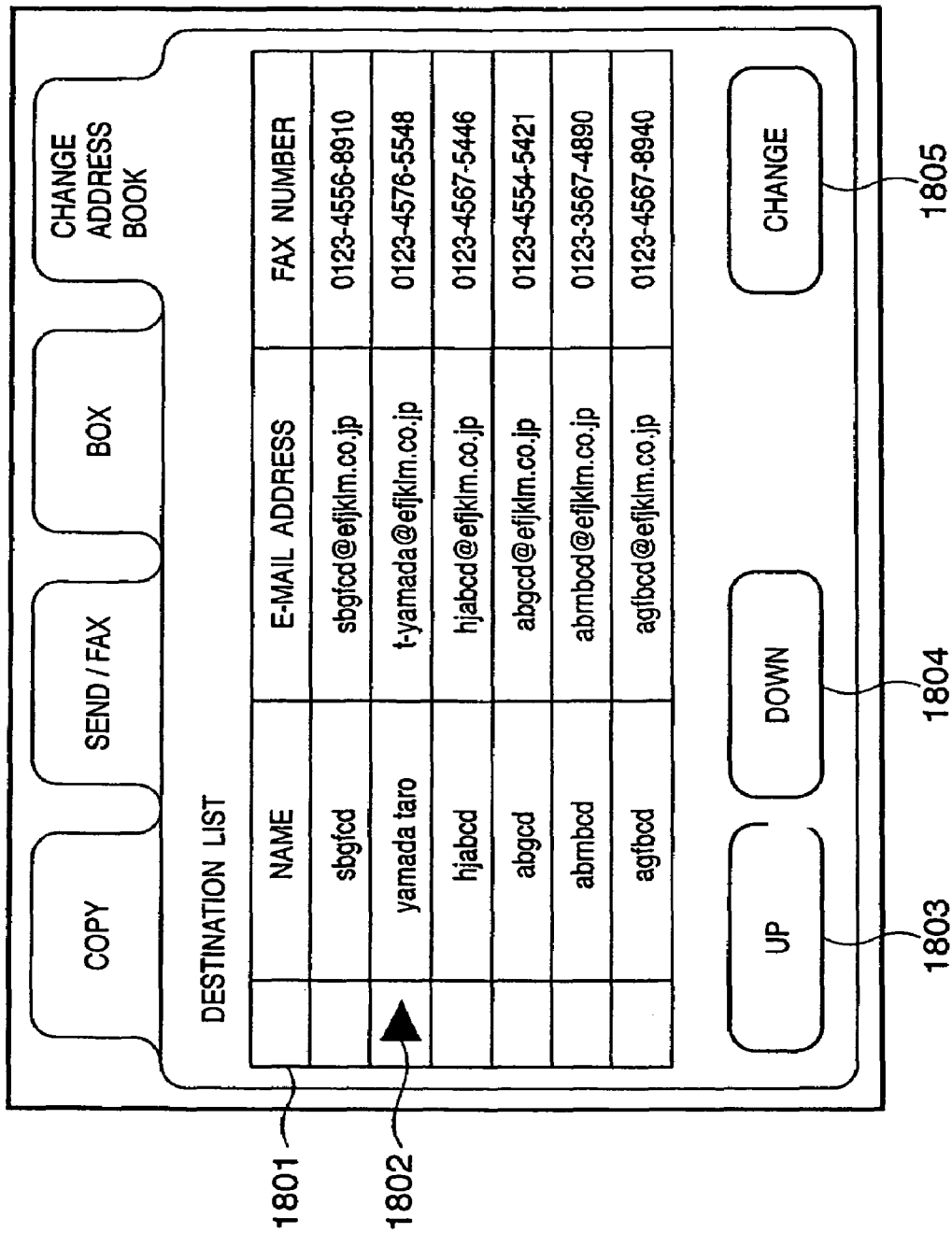
FIG. 18 is a diagram showing an example of a display screen on the operating section displayed when a record is selected to update an address book.
Figure 19:
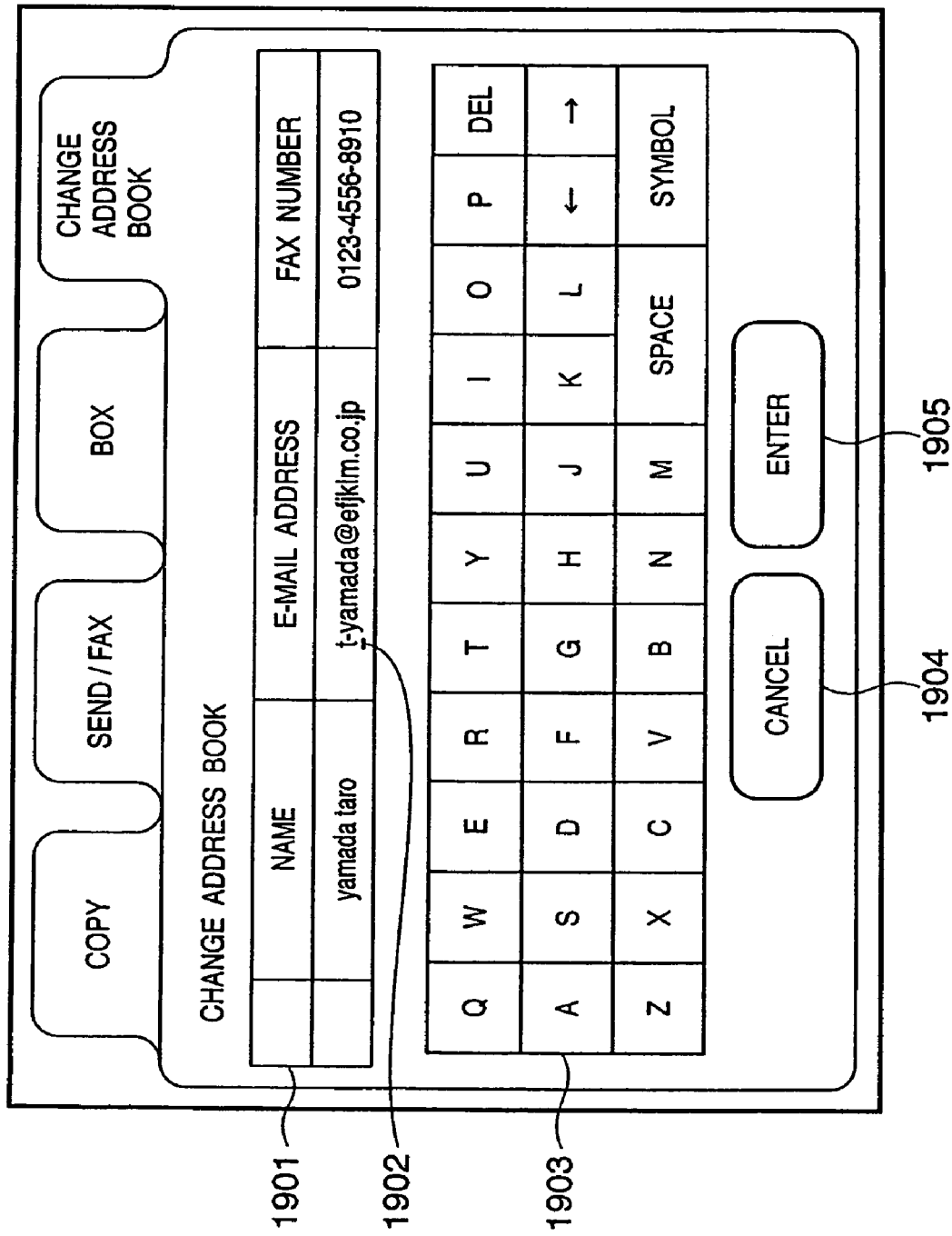
FIG. 19 is a diagram showing an example of a display screen on the operating section displayed when a record is edited to update the address book.

In step S1702, the contents of the address book table 3200 are changed in accordance with the user A's operation of editing the address book. However, in step S1702, the change is made to the temporary storage region, with the changed contents not applied to the address book table 3200. The user selects Address Book Change from an operating section menu in order to edit the address book. The user further selects a record to be changed. FIG. 18 shows an example of an operating section screen that allows the user to change the address book. Reference numeral 1801 denotes the address book in which information on the destination addresses is stored. A black triangle shown at 1802 is a symbol denoting an item currently selected to be changed. The change target can be moved upward using an up button 1803. It can also be moved downward using a down button 1804. When the change button 1804 is depressed to change the selected record, an "Address Book Change" screen shown in FIG. 19 is displayed. The contents of a record A to be changed are shown at 1901. A cursor 1902 shows a character to be changed, thus enabling the user to change the contents of the address book by operating a virtual keyboard 1903. On this screen, the user updates the value of a specified field in a specified record. The updated record is temporarily stored.

In step S1703, the MFP determines whether or not a "Cancel button" 1904 has been depressed. If the "Cancel button" has been depressed, the process proceeds to step S1706. Otherwise the process proceeds to step S1704.

In step S1704, the MFP determines whether or not an "Enter button" 1905 has been depressed. If the "Enter button" has been depressed, the process proceeds to step S1705. Otherwise the process proceeds to step S1703.

In step S1705, the contents of the address book are updated in accordance with the edition. That is, the contents updated in step S1702 are written to the address book table 3200. At the same time, the current date and time (that is, the update date and time) is stored in a record update date and time record column 3205 present in a record (in the present example, a record A) to be updated (before and after the update). The date and time is read from a date and time clock provided in the core control section 709. This applies to all the embodiments.

In step S1706, the user logs out of the device. This completes the series of operations. The logout operation can be performed by depressing a logout key (not shown) present in the operating section 211. The user may actually shift to another operation without logging out of the device.

Figure 17B:
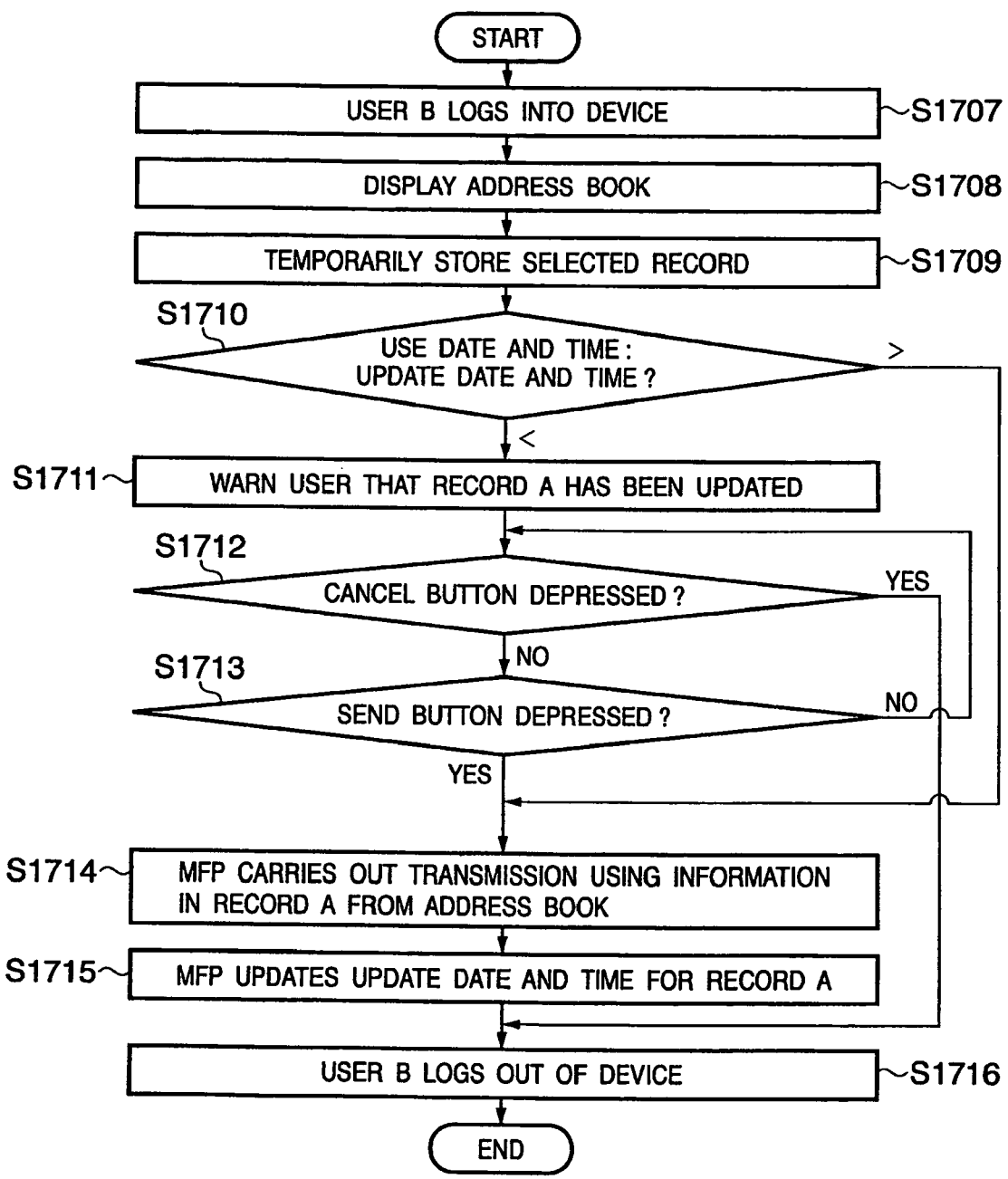
FIG. 17B is a flowchart showing an operation of the first embodiment of the present invention.

Now, with reference to the flowchart in FIG. 17B, description will be given of an operation performed during transmission. In step S1707, a user B uses the operating section of the MFP to log into the device. For the login, for example, the user uses the keyboard to input the number (login ID) already provided for the user. The user can further input the preset password corresponding to the login ID. The process executed by the MFP is similar to that executed in step S1501 in FIG. 15. Subsequently, the user can operate the MFP.

In step S1708, the address book table 3200 is read and displayed on the operating section 211. The user B sets documents to be transmitted. In step S1709, once the user B selects a destination, a record selected for the destination is temporarily stored. The desired function ("Send/Fax" in accordance with the present invention) is assumed to have already been selected. FIG. 16 shows an example of a screen displayed on the operating section 211 to allow the user to select a destination. In FIG. 16, reference numeral 1601 denotes the contents of the address book in which information on the destination addresses is stored. Symbol 1602 denotes an item currently selected as a destination. This symbol, that is, the destination, can be moved upward using the up button 1603. It can also be moved downward using the down button 1604. The symbol indicating that the item has been selected is stored in the memory as a pointer pointing to the selected record or a flag corresponding to each record. Since the present invention performs a characteristic operation if the record A updated by the user A is selected, the record A is assumed to be selected as a destination. Of course, any other record may be selected without posing any problem. After the selection, the user depresses the "Fax Send button" 1605 or the "E-mail Send button" 1606.

In step S1710, the MFP compares the last use date and time 3204 with the update date and time 3205 of the record (in the present example, the record A) selected in the address book table 3200 as a destination. If the update date and time is newer than the last use date and time, the process proceeds to step S1711. Otherwise the process proceeds to step S1716.

Figure 20:
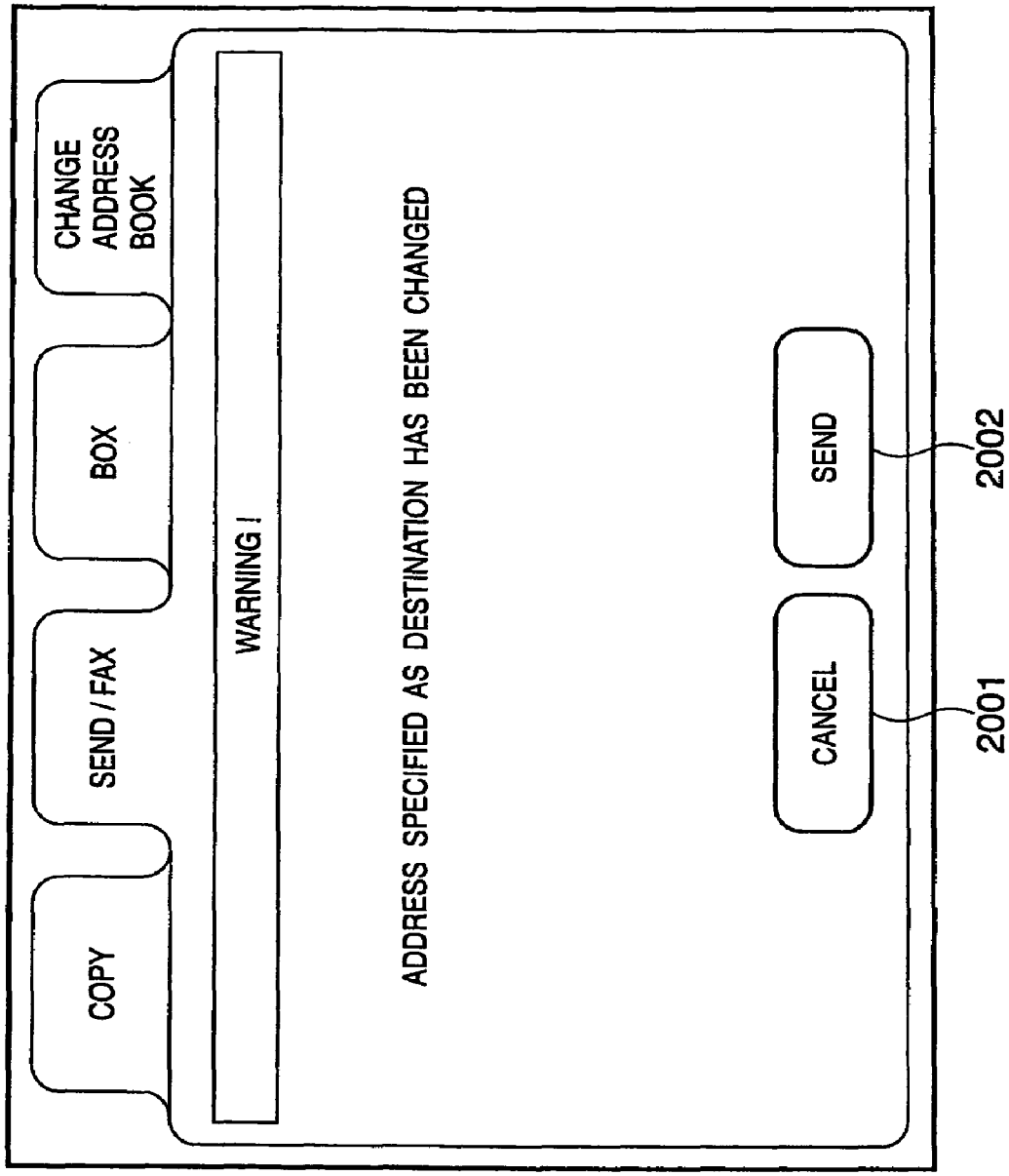
FIG. 20 is a diagram showing an example of a display screen on the operating section displayed when the address of the destination has been updated.

In step S1711, the MFP displays a warning message on, for example, the operating section 211. FIG. 20 shows an example of a displayed warning message.

In step S1712, the device determines whether or not the "Cancel button" 2001 on the warning message has been depressed. If the button has been depressed, the process proceeds to step S1716. Otherwise, the process proceeds to step S1713.

In step S1713, the device determines whether or not the "Send button" 2002 has been depressed. If the button has been depressed, the process recovers the "Send/Fax screen" shown in FIG. 16 and proceeds to step S1714. Otherwise the process proceeds to step S1712.

In step S1714, the MFP reads the document and transmits a read image. If the "Fax Send button" 1605 has been depressed in step S1709, the image is transmitted by fax to the number (that is, the fax number contained in the record selected in step S1709) specified by the fax number item for the destination, as fax data. If the "E-mail Send button" 1606 has been depressed, the read image is transmitted to the address (that is, the e-mail address contained in the record selected in step S1709) specified by the e-mail address item for the destination, as an e-mail attachment file.

In step S1715, the MFP stores the current time in the last use date and time item 3204 in the selected record (in the present example, the record A).

In step S1716, the user logs out of the MFP. The user performs this operation by depressing the logout key (not shown) attached to the operating section 211.

With the above procedure, if data is transmitted using address information updated after the last use, a warning indicating the update is given to the user. This makes it possible to prevent image data from being transmitted to an incorrect destination by e-mail or fax.

<Modification>

In the present invention, the target for warning is a record the contents of which have been changed. However, the target for warning may be a newly added record with a blank last use date and time item, that is, a destination to which data is transmitted for the first time. The device also determines in step S1710 whether or not the last update date and time item is blank (or null). If the item is blank, the process branches to step S1711. This makes it possible to urge the user to check even a newly registered address, thus preventing image data from being transmitted to an incorrect destination.

Second Embodiment of the Present Invention

Figure 21:
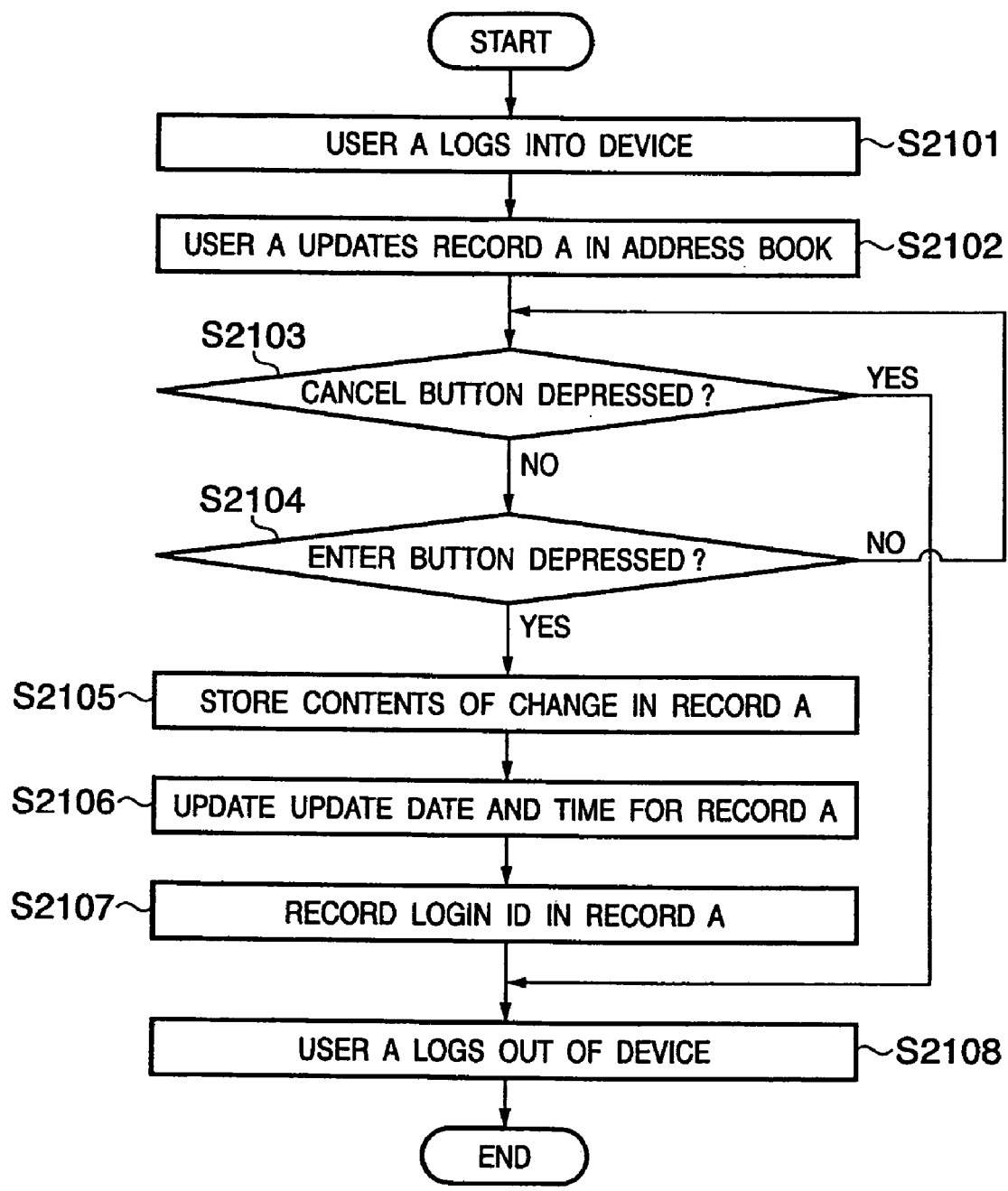
FIG. 21 is a flowchart showing an operation of a second embodiment of the present invention.

Next, description will be given of another embodiment of the present invention that is an operation of giving a warning if the data in the address book is changed, after the last use, by a user with a different login number. The configuration of the device is as described with reference to FIGS. 14 to 16. Thus, differences from the first embodiment will be mainly described below. First, FIG. 29 shows an address book table used in the present embodiment. This corresponds to the table shown in FIG. 28 and in which the ID 3306 of the last updater is added to each record. With reference to the flowchart in FIG. 21, description will be given of an operation performed if a change is made to the address book in which information on the destinations is stored.

In step S2101, the user A operates the operating section of the MFP to log into the device. For the login, for example, the user uses the keyboard to input the number (login ID) already provided for the user. The user can further input the preset password corresponding to the login ID. Subsequently, the user can operate the MFP. The process executed by the MFP is similar to that executed in step S1501 in FIG. 15.

In step S2102, the contents of the address book table 3300 are changed in accordance with the user A's operation of editing the address book. However, in step S2102, the change is made to the temporary storage region, with the changed contents not applied to the address book table 3200. The user selects Address Book Change from an operating section menu in order to edit the address book. The user further selects a record to be changed. FIG. 18 shows an example of an operating section screen that allows the user to change the address book. Reference numeral 1801 denotes the address book in which information on the destination addresses is stored. The black triangle shown at 1802 is a symbol denoting an item currently selected to be changed. The change target can be moved upward using the up button 1803. It can also be moved downward using the down button 1804. When the change button 1804 is depressed to change the selected record, the "Address Book Change" screen shown in FIG. 19 is displayed. The contents of a record A to be changed are shown at 1901. The cursor 1902 shows a character to be changed, thus enabling the user to change the contents of the address book by operating the virtual keyboard 1903. On this screen, the user updates the value of a specified field in a specified record. The updated record is temporarily stored.

In step S2103, the MFP determines whether or not the "Cancel button" 1904 has been depressed. If the "Cancel button" has been depressed, the process proceeds to step S2106. Otherwise the process proceeds to step S2104.

In step S2104, the MFP determines whether or not the "Enter button" 1905 has been depressed. If the "Enter button" has been depressed, the process proceeds to step S2105. Otherwise the process proceeds to step S2103.

In step S2105, the contents of the address book are updated in accordance with the edition. That is, the contents updated in step S2102 are written to the address book table 3200.

In step S2106, the current date and time is stored in a record update date and time record column 3205 present in the record (in the present example, the record A) in the address book table 3300 to be updated.

In step S2107, the current login ID is stored in an updater login ID record column 3306 present in the record (in the present example, the record A) in the address book table 3300 to be updated. In the present example, since only the user A has logged into the device, so that the user A's ID is stored.

In step S2108, the user A logs out of the device. This completes the series of operations. The logout operation can be performed by depressing the logout key (not shown) present in the operating section 211. The user may actually shift to another operation without logging out of the device.

Figure 22:
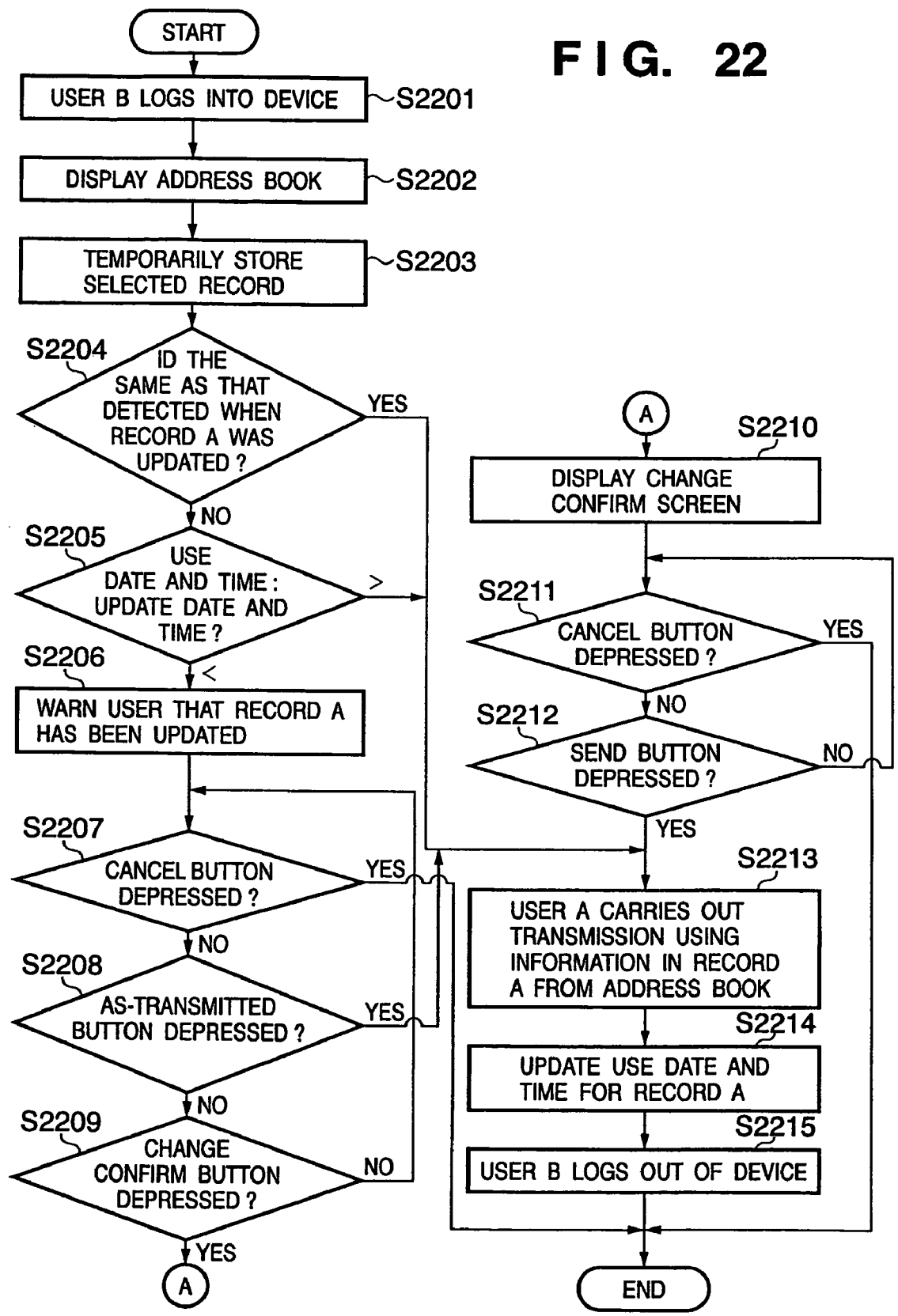
FIG. 22 is a flowchart showing an operation of the second embodiment of the present invention.

Now, with reference to the flowchart in FIG. 22, description will be given of an operation performed during transmission.

In step S2201, the user B uses the operating section of the MFP to log into the device. For the login, for example, the user uses the keyboard to input the number (login ID) already provided for the user. The user can further input the preset password corresponding to the login ID. Subsequently, the user can operate the MFP. The process executed by the MFP is similar to that executed in step S1501 in FIG. 15.

In step S2202, the address book table 3200 is read and displayed on the operating section 211. The user B sets documents to be transmitted.

In step S2203, once the user B selects a destination, a record selected for the destination is temporarily stored. The desired function ("Send/Fax" in accordance with the present invention) is assumed to have already been selected. FIG. 16 shows an example of the screen displayed on the operating section 211 to allow the user to select a destination. In FIG. 16, reference numeral 1601 denotes the contents of the address book in which information on the destination addresses is stored. Symbol 1602 denotes an item currently selected as a destination. This symbol, that is, the destination, can be moved upward using the up button 1603. It can also be moved downward using the down button 1604. The symbol indicating that the item has been selected is stored in the memory as a pointer pointing to the selected record or a flag corresponding to each record. Since the present invention performs a characteristic operation if the record A updated by the user A is selected, the record A is assumed to be selected as a destination. Of course, any other record may be selected without posing any problem. After the selection, the user depresses the "Fax Send button" 1605 or the "E-mail Send button" 1606.

In step S2204, the MFP compares the current login ID with the value of the login ID used to update the record (in the present example, the record A), that is, the ID 3306 of the last updater who updated the record A selected in the address book table 3300. If these IDs are the same, the process proceeds to step S2213. Otherwise the process proceeds to step S2205.

In step S2205, the MFP compares the last use date and time 3204 with the update date and time 3205 of the record (in the present example, the record A) selected as a destination. If the update date and time 3205 is newer than the last use date and time 3204, the process proceeds to step S2206. Otherwise the process proceeds to step S2213.

Figure 23:
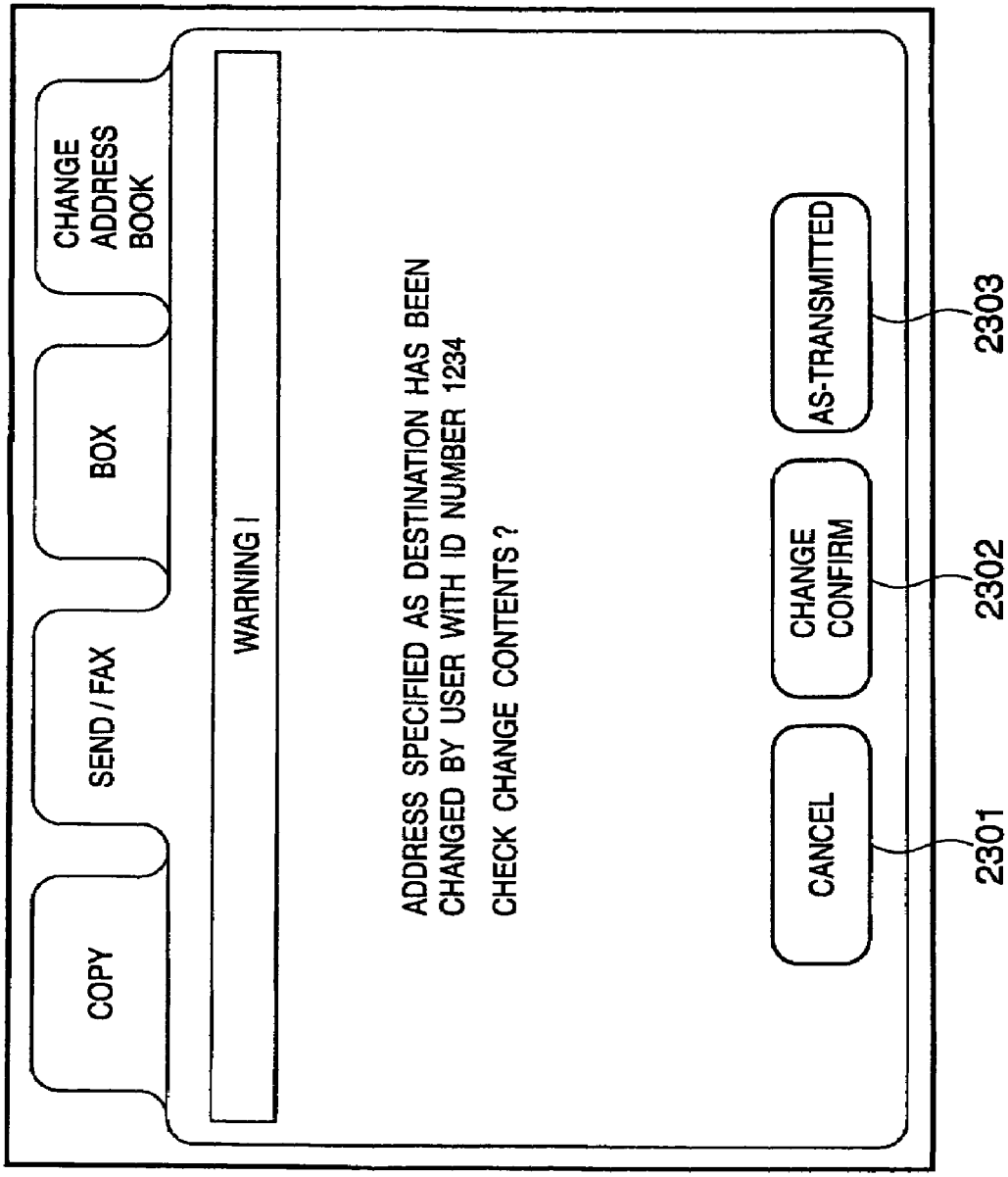
FIG. 23 is a diagram showing an example of a display screen on the operating section displayed when the address of the destination has been updated.

In step S2206, the MFP displays a warning message. FIG. 23 shows an example of a displayed warning message. In the present embodiment, the ID number of the user who has changed the data is stored. Thus, displaying the ID number enables the identification of the user or user group that has changed the data.

In step S2207, the device determines whether or not a "Cancel button" 2301 on the warning message has been depressed. If the button has been depressed, the process ends. Otherwise, the process proceeds to step S2208.

In step S2208, the device determines whether or not an "As-Transmitted button" 2303 has been depressed. If the button has been depressed, the process proceeds to step S2213. Otherwise the process proceeds to step S2209.

In step S2209, the device determines whether or not a "Change Confirm" 2302 has been depressed. If the button has been depressed, the process proceeds to step S2210. Otherwise the process proceeds to step S2207.

In step S2210, a "Confirmation Screen for Changes" is displayed. FIG. 24 shows an example of the "Confirmation Screen for Changes".

In step S2211, the device determines whether or not a "Cancel button" 2401 on the "Confirmation Screen for Changes" has been depressed. If the button has been depressed, the process ends. Otherwise, the process proceeds to step S2212.

In step S2209, the device determines whether or not a "Send button" 2402 has been depressed. If this button has been depressed, the process recovers the "Send/FAX screen" shown in FIG. 16 and proceeds to step S2213. Otherwise the process proceeds to step S2211.

In step S2213, the MFP transmits the data in the document. If the "Fax Send button" 1605 has been depressed in step S2203, the image is transmitted by fax to the number (that is, the fax number contained in the record selected in step S2203) specified by the fax number item for the destination, as fax data. If the "E-mail Send button" 1606 has been depressed, the read image is transmitted by-email to the address (that is, the e-mail address contained in the record selected in step S2203) specified by the e-mail address item for the destination, as an e-mail attachment file.

In step S2214, the MFP stores the current time in the last use date and time item 3204 in the selected record (in the present example, the record A). In step S2215, the user logs out of the MFP. The user performs this operation by depressing the logout key (not shown) attached to the operating section 211.

With the above procedure, according to the present embodiment, if the address information to be transmitted is updated by a person different from the user intending to transmit the information and if the update follows the last transmission, a warning is given to the user. This avoids giving a warning if the transmitter changes the address information. It is thus possible to eliminate the need for complicated operations.

Third Embodiment of the Present Invention

Figure 25A:
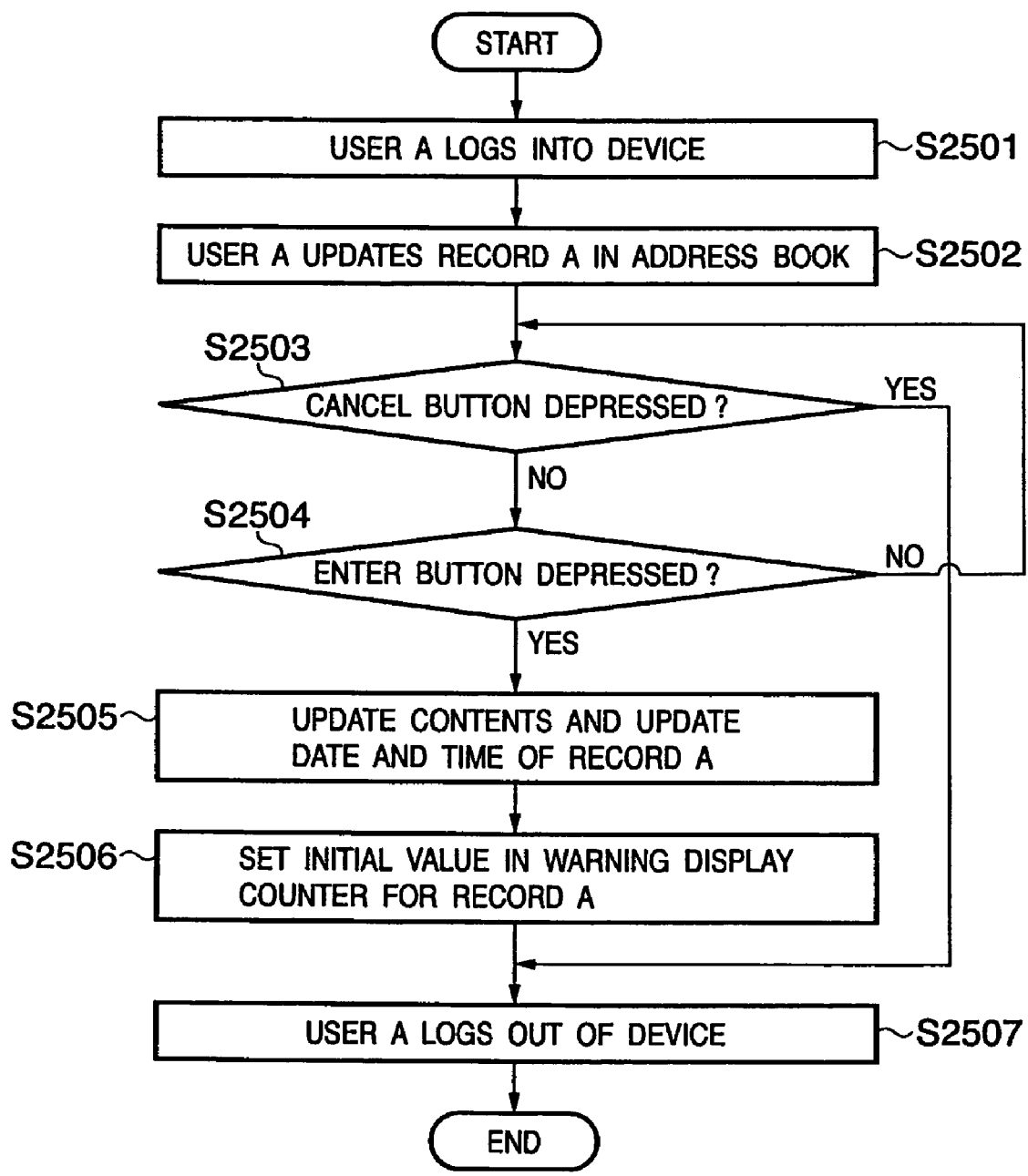
FIG. 25A is a flowchart showing an operation of a third embodiment of the present invention.

Next, description will be given of a third embodiment of the present invention which is an operation of giving a finite number of warnings if the data in the address book is changed after the last use. The configuration of the device is as described with reference to FIGS. 1 to 14 and 16. Thus, differences from the first embodiment will be mainly described below. First, FIG. 30 shows an address book table 3400 used in the present embodiment. This corresponds to the table shown in FIG. 28 and in which a warning display counter 3406 is added to each record. With reference to the flowchart in FIG. 25A, description will be given of an operation performed if a change is made to the address book in which information on the destinations is stored.

In step S2501, the user A operates the operating section of the MFP to log into the device. For the login, for example, the user uses the keyboard to input the number (login ID) already provided for the user. The user can further input the preset password corresponding to the login ID. Subsequently, the user can operate the MFP. The process executed by the MFP is similar to that executed in step S1501 in FIG. 15.

In step S2502, the contents of the address book table 3400 are changed in accordance with the user A's operation of editing the address book. However, in step S2502, the change is made to the temporary storage region, with the changed contents not applied to the address book table 3400. The user selects Address Book Change from the operating section menu in order to edit the address book. The user further selects a record to be changed. FIG. 18 shows an example of an operating section screen that allows the user to change the address book. Reference numeral 1801 denotes the address book in which information on the destination addresses is stored. The black triangle shown at 1802 is a symbol denoting an item currently selected to be changed. The change target can be moved upward using the up button 1803. It can also be moved downward using the down button 1804. The symbol indicating that the item has been selected is stored in the memory as a pointer pointing to the selected record or a flag corresponding to each record. When the change button 1804 is depressed to change the selected record, the "Address Book Change" screen shown in FIG. 19 is displayed. The contents of a record A to be changed are shown at 1901. The cursor 1902 shows a character to be changed, thus enabling the user to change the contents of the address book by operating the virtual keyboard 1903. On this screen, the user updates the value of a specified field in a specified record. The updated record is temporarily stored.

In step S2503, the MFP determines whether or not the "Cancel button" 1904 has been depressed. If the "Cancel button" has been depressed, the process proceeds to step S2506. Otherwise the process proceeds to step S2504.

In step S2504, the MFP determines whether or not the "Enter button" 1905 has been depressed. If the "Enter button" has been depressed, the process proceeds to step S2505. Otherwise the process proceeds to step S2503.

In step S2505, the contents of the address book are updated in accordance with the edition. That is, the contents updated in step S2102 are written to the address book table 3400. At the same time, the current date and time is stored in the record update date and time record column 3205 present in the record A.

In step S2506, a pre-specified natural number is input to the warning display counter 3406 stored in the same record.

In step S2507, the user logs out of the device. This completes the series of operations. The logout operation can be performed by depressing the logout key (not shown) present in the operating section 211. Actually, the user may shift to another operation without logging out of the device.

Figure 25B:
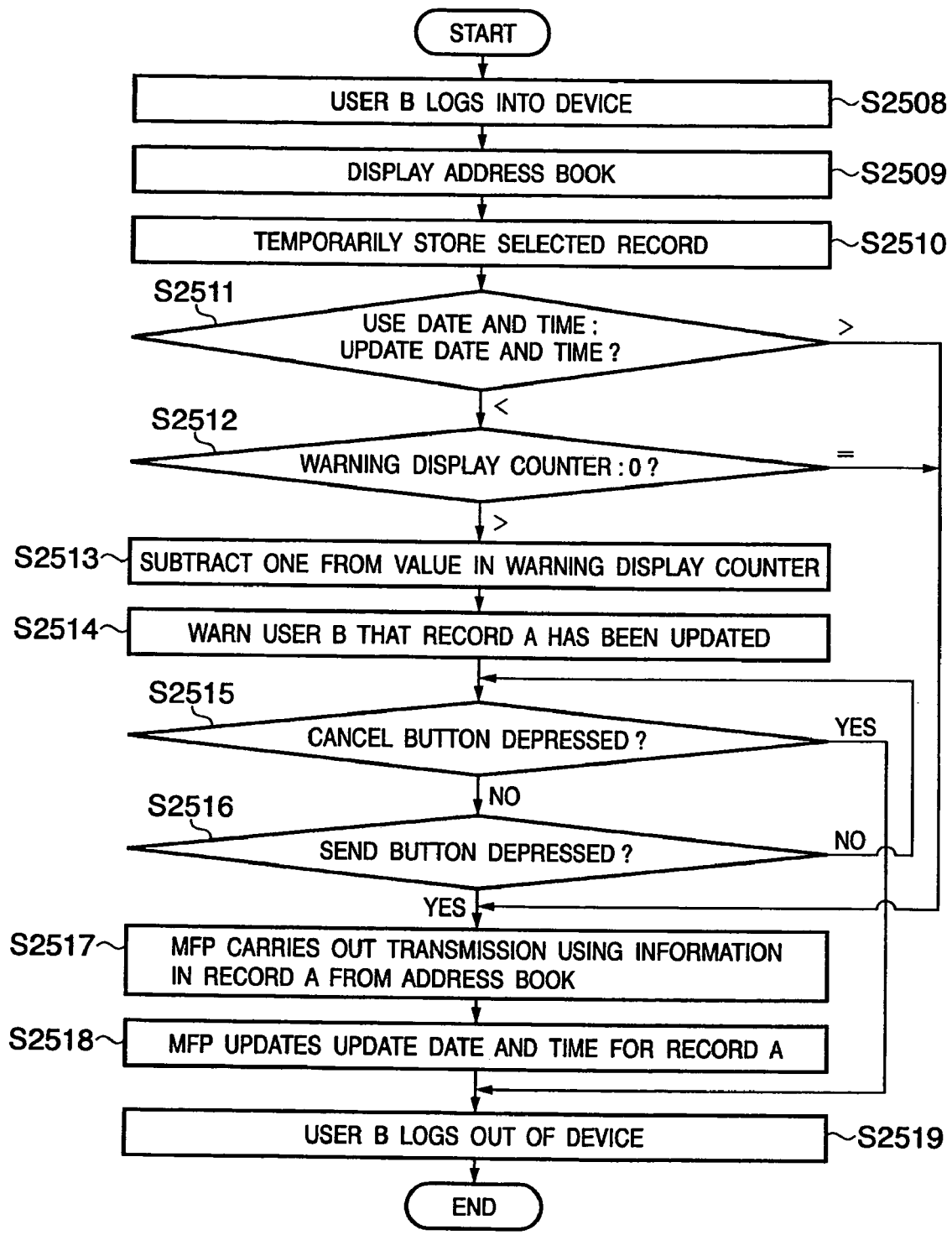
FIG. 25B is a flowchart showing an operation of the third embodiment of the present invention.

Now, with reference to the flowchart in FIG. 25B, description will be given of an operation performed during transmission. In step S2508, the user B uses the operating section of the MFP to log into the device. For the login, for example, the user uses the keyboard to input the number (login ID) already provided for the user. The user can further input the preset password corresponding to the login ID. Subsequently, the user can operate the MFP. The process executed by the MFP is similar to that executed in step S1501 in FIG. 15.

In step S2509, the address book table 3400 is read and displayed on the operating section 211. The user B sets documents to be transmitted.

In step S2510, when the user B selects a destination, the corresponding record is selected and temporarily stored. The desired function ("Send/Fax" in accordance with the present invention) is assumed to have already been selected. FIG. 16 shows an example of the screen displayed on the operating section 211 to allow the user to select a destination. In FIG. 16, reference numeral 1601 denotes the contents of the address book in which information on the destination addresses is stored. Symbol 1602 denotes an item currently selected as a destination. This symbol, that is, the destination, can be moved upward using the up button 1603. It can also be moved downward using the down button 1604. Since the present invention performs a characteristic operation if the record A updated by the user A is selected, the record A is assumed to be selected as a destination. Of course, any other record may be selected without posing any problem. After the selection, the user depresses the "Fax Send button" 1605 or the "E-mail Send button" 1606.

In step S2511, the MFP compares the last use date and time 3204 with the update date and time 3205 of the record (in the present example, the record A) selected as a destination. If the update date and time 3205 is newer than the last use date and time 3204, the process proceeds to step S2511. Otherwise the process proceeds to step S2517.

In step S2512, the MFP determines whether the value in the warning display counter 3406 for the selected record (in the present example, the record A) is 0 or larger than 0. If the value is larger than 0, the process proceeds to step S2513. Otherwise, that is, when the warning display counter 3406 is 0, the process proceeds to step S2517.

In step S2513, the MFP reduces the warning display counter 3406 for the selected record (in the present example, the record A) by one. In step S2514, the MFP displays a warning message. FIG. 20 shows an example of a displayed warning message.

In step S2515, the device determines whether or not the "Cancel button" 2001 on the warning message has been depressed. If the button has been depressed, the process proceeds to step S2519. Otherwise, the process proceeds to step S2516.

In step S2516, the device determines whether or not the "Send button" 2002 has been depressed. If this button has been depressed, the process recovers the "Send/FAX screen" shown in FIG. 16 and proceeds to step S2517. Otherwise the process proceeds to step S2514.

In step S2517, the MFP reads and transmits the document image to the specified destination. If the "Fax Send button" 1605 has been depressed in step S2510, the image is transmitted by fax to the number (that is, the fax number contained in the record selected in step S2510) specified by the fax number item for the destination, as fax data. If the "E-mail Send button" 1606 has been depressed, the read image is transmitted by e-mail to the address (that is, the e-mail address contained in the record selected in step S2510) specified by the e-mail address item for the destination, as an e-mail attachment file.

In step S2518, the MFP stores the current time in the last use date and time item 3204 in the selected record (in the present example, the record A). In step S2519, the user logs out of the MFP. The user performs this operation by depressing the logout key (not shown) attached to the operating section 211.

With the above procedure, if the address book table is updated after the last use date and time and if an attempt is made to transmit data to the destination corresponding to the updated record, a warning is given to the user. The warning is cleared by canceling the transmission. However, a warning is given again when an attempt is made to transmit data to the same destination. In the present embodiment, a specified value is preset in the warning display counter so that if the number of warnings attributed to a certain cause reaches the specified value, a warning is no longer output for the same cause. In other words, an upper limit on the number of warnings can be set. This makes it possible to output a warning against a change in the address book, while reducing complicated operations.

Fourth Embodiment of the Present Invention

Figure 26A:
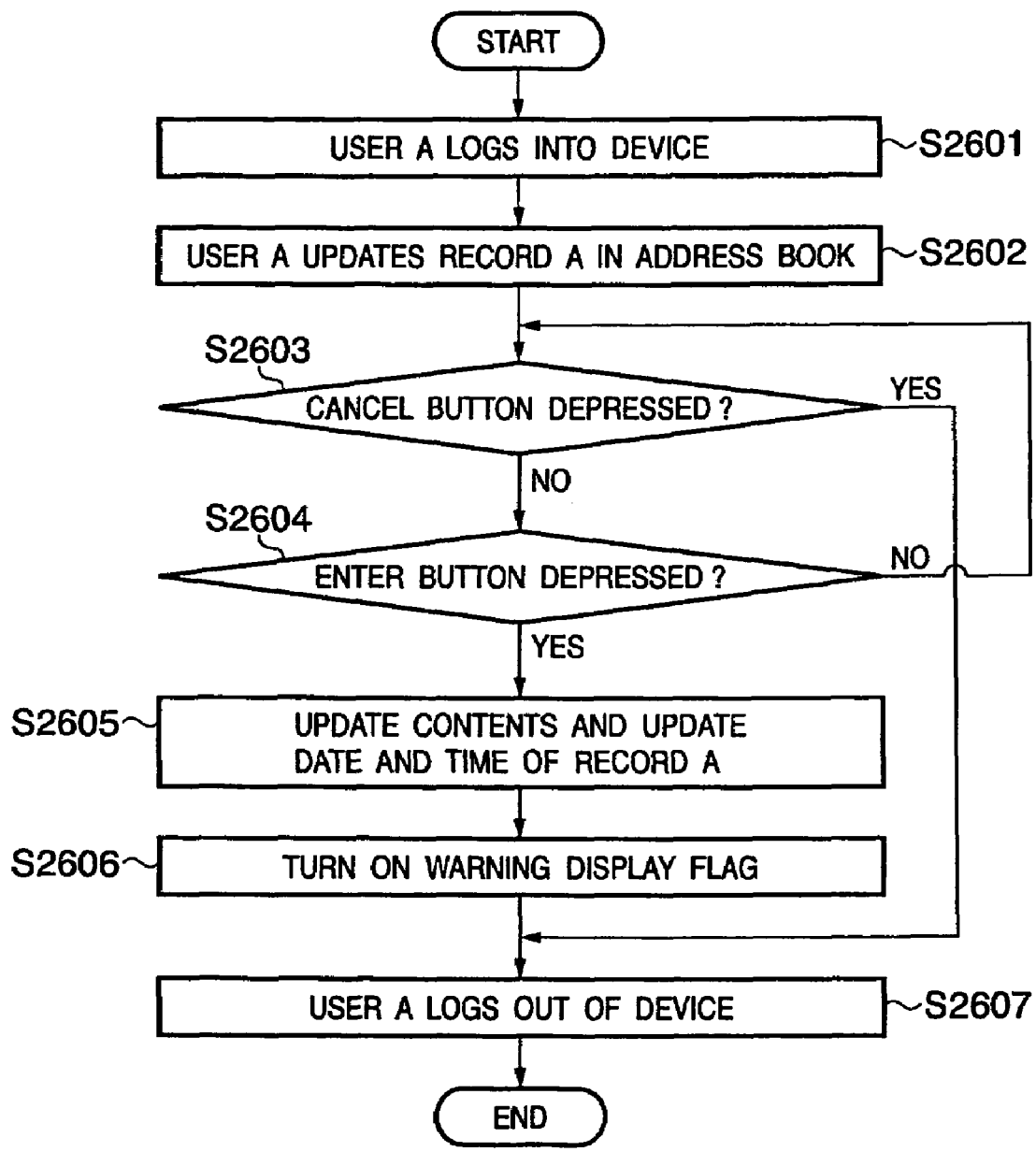
FIG. 26A is a flowchart showing an operation of a fourth embodiment of the present invention.

Next, description will be given of a fourth embodiment of the present invention that is an operation of giving a continuous warning until the user instructs the warning to be suspended if the data in the address book is changed after the last use. The configuration of the device is as described with reference to FIGS. 1 to 14 and 16. Thus, differences from the first embodiment will be mainly described below. First, FIG. 31 shows an address book table 3500 used in the present embodiment. This corresponds to the table shown in FIG. 28 and in which a warning display flag 3506 is added to each record. With reference to the flowchart in FIG. 26A, description will be given of an operation performed if a change is made to the address book in which information on the destinations is stored.

In step S2601, the user A operates the operating section of the MFP to log into the device. For the login, for example, the user uses the keyboard to input the number (login ID) already provided for the user. The user can further input the preset password corresponding to the login ID. Subsequently, the user can operate the MFP. The process executed by the MFP is similar to that executed in step S1501 in FIG. 15.

In step S2602, the contents of the address book table 3500 are changed in accordance with the user A's operation of editing the address book. However, in step S2602, the change is made to the temporary storage region, with the changed contents not applied to the address book table 3500. The user selects Address Book Change from the operating section menu in order to edit the address book. The user further selects a record to be changed. FIG. 18 shows an example of an operating section screen that allows the user to change the address book. Reference numeral 1801 denotes the address book in which information on the destination addresses is stored. The black triangle shown at 1802 is a symbol denoting an item currently selected to be changed. The change target can be moved upward using the up button 1803. It can also be moved downward using the down button 1804. The symbol indicating that the item has been selected is stored in the memory as a pointer pointing to the selected record or a flag corresponding to each record. When the change button 1804 is depressed to change the selected record, the "Address Book Change" screen shown in FIG. 19 is displayed. The contents of a record A to be changed are shown at 1901. The cursor 1902 shows a character to be changed, thus enabling the user to change the contents of the address book by operating the virtual keyboard 1903. On this screen, the user updates the value of a specified field in a specified record. The updated record is temporarily stored.

In step S2603, the MFP determines whether or not the "Cancel button" 1904 has been depressed. If the "Cancel button" has been depressed, the process proceeds to step S2606. Otherwise the process proceeds to step S2604.

In step S2604, the MFP determines whether or not the "Enter button" 1905 has been depressed. If the "Enter button" has been depressed, the process proceeds to step S2605. Otherwise the process proceeds to step S2603.

In step S2605, the contents of the address book are updated in accordance with the edition. That is, the contents updated in step S2602 are written to the address book table 3500. At the same time, the current date and time is stored in the record update date and time record column 3205 present in the selected record (in the present example, the record A).

In step S2606, a warning execution flag 3506 stored in the selected record (in the present example, the record A) is set.

In step S2607, the user logs out of the device. This completes the series of operations. The logout operation can be performed by depressing the logout key (not shown) present in the operating section 211. The user may actually shift to another operation without logging out of the device.

Figure 26B:
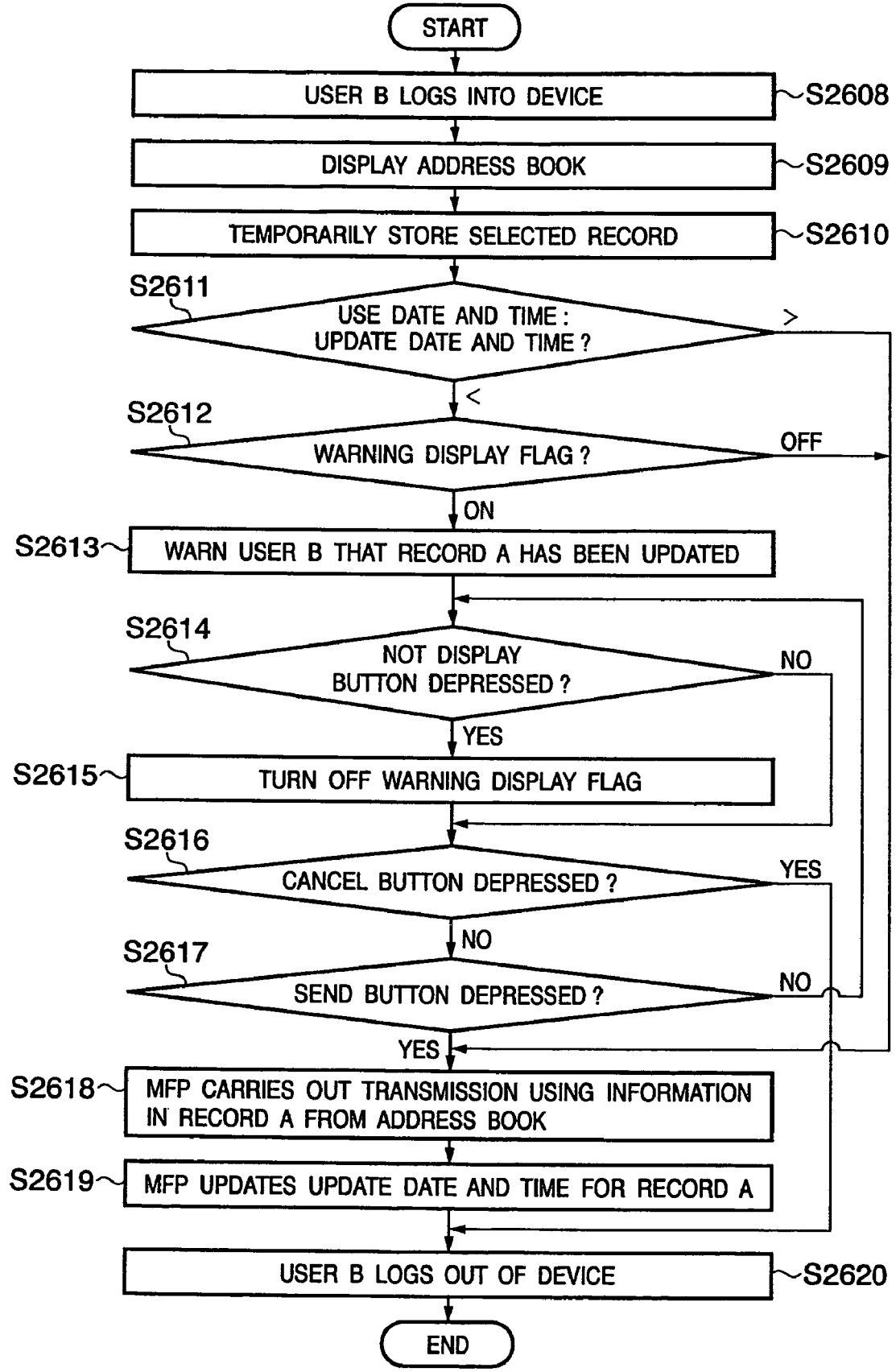
FIG. 26B is a flowchart showing an operation of the fourth embodiment of the present invention.

Now, with reference to the flowchart in FIG. 26B, description will be given of an operation performed during transmission. In step S2608, the user B uses the operating section of the MFP to log into the device. For the login, for example, the user uses the keyboard to input the number (login ID) already provided for the user. The user can further input the preset password corresponding to the login ID. Subsequently, the user can operate the MFP. The process executed by the MFP is similar to that executed in step S1501 in FIG. 15.

In step S2609, the address book table 3500 is read and displayed on the operating section 211. The user B sets documents to be transmitted.

In step S2610, once the user B selects a destination, a record selected for the destination is temporarily stored. The desired function ("Send/Fax" in accordance with the present invention) is assumed to have already been selected. FIG. 16 shows an example of a screen displayed on the operating section 211 to allow the user to select a destination. In FIG. 16, reference numeral 1601 denotes the contents of the address book in which information on the destination addresses is stored. Symbol 1602 denotes an item currently selected as a destination. This symbol, that is, the destination, can be moved upward using the up button 1603. It can also be moved downward using the down button 1604. Since the present invention performs a characteristic operation if the record A updated by the user A is selected, the record A is assumed to be selected as a destination. Of course, any other record may be selected without posing any problem. After the selection, the user depresses the "Fax Send button" 1605 or the "E-mail Send button" 1606.

In step S2611, the MFP compares the last use date and time 3204 with the update date and time 3205 of the record (in the present example, the record A) selected as a destination. If the update date and time 3205 is newer than the last use date and time 3204, the process proceeds to step S2611. Otherwise the process proceeds to step S2617.

In step S2612, the MFP determines whether or not the warning display flag for the selected record (in the present example, the record A) is on. If the warning display flag is on, the process proceeds to step S2613. Otherwise the process proceeds to step S2618.

In step S2613, the MFP displays a warning message. FIG. 27 shows an example of a displayed warning message. A checkbox 2701 is means for informing the user whether or not this display will be provided for the next same event. If there is a checkmark in the checkbox, the MFP can inform the user that this warning display will be provided for the next same event. If there is no checkmark in the checkbox, the MFP can inform the user that the warning display will not be provided for the next same event. The contents of this display reflect the contents of a warning display flag 3605. Turning on the warning display flag allows the checkmark to be displayed. Turning off the warning display flag inhibits the checkmark from being displayed. Consequently, the checkmark is always displayed immediately after the warning message is displayed.

In step S2614, the device determines whether or not a "Not Display button" 2704 on the warning message has been depressed. If the button has been depressed, the process proceeds to step S2615. Otherwise the process proceeds to step S2616.

In step S2615, the MFP turns off the warning display flag. The MFP further deletes the checkmark from the checkbox 2701 on the warning display.

In step S2616, the device determines whether or not the user B has depressed a "Cancel button" 2702 on the warning message. If the button has been depressed, the process proceeds to step S2620. Otherwise, the process proceeds to step S2617.

In step S2617, the device determines whether or not a "Send button" 2703 has been depressed. If this button has been depressed, the process recovers the "Send/FAX screen" shown in FIG. 16 and proceeds to step S2618. Otherwise the process proceeds to step S2614.

In step S2618, the MFP transmits the document. If the "Fax Send button" 1605 has been depressed in step S2610, the image is transmitted by fax to the number (that is, the fax number contained in the record selected in step S2610) specified by the fax number item for the destination, as fax data. If the "E-mail Send button" 1606 has been depressed, the read image is transmitted by e-mail to the address (that is, the e-mail address contained in the record selected in step S2610) specified by the e-mail address item for the destination, as an e-mail attachment file.

In step S2619, the MFP stores the current time in the last use date and time item 3205 in the selected record (in the present example, the record A). In step S2620, the user logs out of the MFP. The user performs this operation by depressing the logout key (not shown) attached to the operating section 211.

With the above procedure, according to the present embodiment, if the last update date and time is newer than the last use date and time, the warning is output until the user explicitly inputs the warning cancel instruction. The second and subsequent warnings are thus avoided by the user by explicitly instructing them to be canceled. This relieves the user of the bother of receiving the warning output. Of course, if the last update time is newer than the last use date and time, the warning against updated address information is output at least once. This makes it possible to prevent data from being transmitted to an incorrect destination.

Other Embodiments

The first to fourth embodiments have been described but may be combined together. For example, a combination of the second and third embodiments enables a warning to be output only if the transmitter is different from the address information updater, while enabling the upper limit on the number of warnings to be set. A combination of the second and fourth embodiments enables the upper limit on the number of warnings to be set, while enabling the warning to be canceled by the user's explicit instruction. A combination of the second, third, and fourth embodiments enables a warning to be output only if the transmitter is different from the address information updater, while enabling the setting of the upper limit on the number of warnings and the cancellation of the warning through the user's explicit instruction.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-044460 filed on Feb. 21, 2005, which is hereby incorporated by reference herein its entirety.

What is claimed is:

1. A data transmission device for transmitting data to a destination identified by prestored destination information, the data transmission device comprising:
   a processor;
   a memory coupled to said processor;
   a destination designation section configured to accept a designation of a destination identifier corresponding to a destination, from among the destination information;
   a transmission section configured to transmit data to the destination designated by said destination designation section;
   a first determining section configured to determine whether the destination information was updated after a last data transmission carried out with reference to the destination information corresponding to the destination designated by said destination designation section;
   a notifying section configured to determine whether the destination information was updated after the last data transmission to the destination corresponding to the destination identifier designated by said destination designation section, issue a warning indicating the destination information has been updated;
   an authenticating section configured to authenticate ID information; and
   a second determining section configured to determine whether the destination information was updated after the last data transmission to the destination, determine whether ID information associated with an issuance of the transmission instruction is the same as ID information associated with the update of the destination information,
   wherein, if said first determining section determines that the destination information was updated after the last data transmission to the destination and if said second determining section determines that the ID information associated with the issuance of the transmission instruction is different from the ID information associated with the update of the destination information, said notifying section issues the warning indicating the destination information has been updated,
   wherein said notifying section issues the warning before said transmission section transmits the data to the designated destination, if the destination identifier is designated by said destination designation section, and
   wherein the warning includes a message encouraging confirmation of an update of the destination information.

2. The data transmission device according to claim 1, wherein the destination information is stored in association with update time information indicating a last time when the destination information was updated and transmission time information indicating the last time when data was transmitted to the destination identified in the destination information, and
   wherein the data transmission device further comprises:
      a transmission time updating section configured to, if data has been transmitted in accordance with the transmission instruction, update the transmission time information of the destination based on a time of the update; and
      an update time updating section configured to, if the destination information has been updated, update the update time information on the destination on the basis of the time of the update; and
   wherein, if the time indicated in the update time information is newer than the time indicated in the transmission time information, the determining section determines the destination information was updated after the last data transmission to the destination.

3. The data transmission device according to claim 1, wherein an upper limit is set on a number of times the notifying section issues the warning indicating the destination information has been updated, and if the number of times the notifying section issues the warning indicating the destination information has been updated reaches the upper limit, the notifying section no longer issues the warning.

4. The data transmission device according to claim 1, further comprising a non-notification instructing section configured to input an instruction on avoidance of notifications by the notifying section, and if the non-notification instructing section has input the instruction, the notifying section does not issue the warning indicating the destination information has been updated.

5. The data transmission device according to claim 1, wherein data is transmitted by facsimile transmission, e-mail, file sharing, or file transfer.

6. A data transmission device according to claim 1, wherein the device is incorporated in an image reading apparatus including:
- an image reading section configured to read image data; and
- a transmission instructing section configured to input the transmission instruction on transmission of read image data to a destination identified in the prestored destination information.

7. A method for controlling data transmission performed by a data transmission device configured to store, in a memory, destination information indicating a data destination, update time information indicating a last time when the destination information was updated, and transmission time information indicating a last time when data was transmitted to the destination, the information being associated, the method comprising:
- accepting a designation of a destination identifier corresponding to a destination, from among the destination information;
- transmitting data to the destination designated in said destination designation step;
- referring to the transmission time information and the update time information to determine whether the destination information has been updated after the last data transmission carried out with reference to the destination information corresponding to the destination designated in said designation step;
- if the destination information is determined to have been updated after the last data transmission to the destination corresponding to the destination identifier designated in said destination designation, issues a warning indicating the destination information has been updated;
- authenticating ID information; and
- if a determination is made in said first determining step that the destination information was updated after the last data transmission to the destination, determining whether ID information associated with an issuance of the transmission instruction is the same as ID information associated with the update of the destination information,
- wherein, if the determination is made in said first determining step that the destination information was updated after the last data transmission to the destination and if a determination is made in said second determining step that the ID information associated with the issuance of the transmission instruction is different from the ID information associated with the update of the destination information, the warning indicating that the destination information has been updated is issued,
- wherein the warning is issued before the data is transmitted to the destination, if the destination identifier is designated in said destination designation, and
- wherein the warning includes a message encouraging confirmation of an update of the destination information.

8. The method for controlling data transmission according to claim 7, the method further comprising:
- a transmission time updating step of, if data has been transmitted in accordance with the transmission instruction, updating the transmission time information of the destination based on a time of the update; and
- an update time updating step of, if the destination information has been updated, updating the update time information on the destination based on the time of the update,
- wherein, if the time indicated in the update time information is newer than the time indicated in the transmission time information, the first determining step determines the destination information was updated after the last data transmission to the destination.

9. A data transmission device comprising:
- a processor;
- a memory coupled to said processor;
- an address book database configured to store destination information in association with destination identifiers;
- a destination designation section configured to accept a designation of a destination identifier corresponding to a destination from among the destination identifiers;
- a transmission section configured to transmit data to a destination corresponding to the destination identifier;
- if destination identifier is specified as a destination for data, determine whether destination information associated with the destination identifier was updated after a last data transmission with the specified destination identifier;
- a notifying section configured to determine whether the destination information was updated after the last data transmission to the destination corresponding to the specified destination identifier, issues a warning indicating the destination information has been updated;
- an authenticating section configured to authenticate ID information; and
- a second determining section configured to determine whether the destination information was updated after the last data transmission to the destination, determine whether ID information associated with an issuance of the transmission instruction is the same as ID information associated with the update of the destination information,
- wherein, if said first determining section determines that the destination information was updated after the last data transmission to the destination and if said second determining section determines that the ID information associated with the issuance of the transmission instruction is different from the ID information associated with the update of the destination information, said notifying section issues the warning indicating the destination information has been updated,
- wherein said notifying section issues the warning before said transmission section transmits the data to the destination, if the destination identifier is designated by said destination designation section, and
- wherein the warning includes a message encouraging confirmation of an update of the destination information.

10. A computer readable storage medium having computer program instructions embedded therein, said computer program instructions, when executed by a processor, causing a computer to perform a data transmitting method, wherein the computer stores, in a memory, destination information indicating a data destination, update time information indicating a last time when the destination information was updated, and transmission time information indicating a last time when data was transmitted to the destination, the pieces of information being associated with one another, the method comprising:
- accepting a designation of a destination identifier corresponding to a destination from among the destination information;

transmitting data to the destination designated in said destination designation;

if a transmission instruction to transmit data is input, referring to the transmission time information and the update time information to determine whether the destination information has been updated after the last data transmission carried out with reference to the destination information corresponding to the destination designated in said designation;

if the destination information is determined to have been updated after the last data transmission to the destination corresponding to the destination identifier designated in said destination designation step, issuing a warning indicating the destination information has been updated;

authenticating ID information; and if a determination is made that the destination information was updated after the last data transmission to the destination, determining whether ID information associated with an issuance of the transmission instruction is the same as ID information associated with the update of the destination information, if the determination is made that the destination information was updated after the last data transmission to the destination and if a determination is made in said second determining step that the ID information associated with the issuance of the transmission instruction is different from the ID information associated with the update of the destination information, the warning indicating that the destination information has been updated is issued, wherein the warning is issued before the data is transmitted to the destination, if the destination identifier is designated in said destination designation step, and wherein the warning includes a message encouraging confirmation of an update of the destination information.

11. The computer readable storage medium according to claim 10, wherein the method further comprises:

a transmission time updating step of, if data has been transmitted in accordance with the transmission instruction, updating the transmission time information on the destination based on the time of the update; and an update time updating step of, if the destination information has been updated, updating the update time information on the destination based on the time of the update, and if the time indicated in the update time information is newer than the time indicated in the transmission time information, the first determining step determines the destination information was updated after the last data transmission to the destination.

* * * * *